United States Patent [19]

Somraty

[11] 4,359,980
[45] Nov. 23, 1982

[54] ROTATING PISTON ENGINE WITH CONSTANT TORQUE ARM DRIVE OF ITS POWER TAKE-OFF SHAFT

[76] Inventor: Thomas P. Somraty, 437 Minton Ct., Pleasant Hill, Calif. 94523

[21] Appl. No.: 171,396

[22] Filed: Jul. 23, 1980

[51] Int. Cl.³ ............................................. F02B 53/00
[52] U.S. Cl. ................................. 123/245; 123/43 B; 418/34; 418/35
[58] Field of Search ................ 123/245, 43 B; 418/33, 418/34, 35

[56] References Cited

U.S. PATENT DOCUMENTS

| | | | |
|---|---|---|---|
| 150,350 | 4/1874 | Palmer | 123/43 B |
| 1,212,649 | 1/1917 | Krikorian | 418/35 |
| 1,224,642 | 5/1917 | Holmes | 418/35 |
| 1,790,534 | 1/1931 | Chevallier et al. | 418/35 |
| 1,897,962 | 2/1933 | Staaf | 123/43 B |
| 2,280,967 | 4/1942 | Nelson | 123/43 B |
| 3,938,480 | 2/1976 | Yanda | 123/43 B |
| 4,279,577 | 7/1981 | Appleton | 418/35 |

*Primary Examiner*—Michael Koczo, Jr.
*Attorney, Agent, or Firm*—Owen, Wickersham & Erickson

[57] ABSTRACT

A two-cylinder rotary piston internal combustion engine. Two interengaging arcuate piston-cylinder assemblies move in a circular path on an engine plane. The piston of one assembly and the cylinder of the other assembly reciprocate with respect to each other. Two separate, at least partly hollow, rotating, support shafts are rigidly attached to each said piston-cylinder assembly, one on each side of the engine plane and perpendicular to that plane. Each rigidly attached to its piston-cylinder assembly. Two of these support shafts are concentric with a rotary power take-off shaft, while the other two support shafts are concentric with a flywheel shaft on the opposite side of the plane; the flywheel shaft carries a flywheel. A stationary engine casing surrounds the piston-cylinder assemblies and all the support shafts, with the flywheel shaft and power take-off shaft extending out therefrom. First clutching means, in alternation, each of the two support shafts on the power take-off side of the plane, only one support shaft at a time being clutched to the power take-off shaft, for enabling rotation of the power take-off shaft in a single direction only and for enabling rotation of each piston-cylinder assembly in a single direction, only, so that during operation each said assembly alternates with the other said assembly in rotating during one stroke and remaining stationary during the next stroke. Similar second clutching means on the flywheel side of the plane clutch, in alternation, each of these two support shafts to the stationary casing and preventing reverse rotation of those support shafts and of the cylinders. Drive is imparted drive from the piston-cylinder assemblies to the flywheel shaft and vice versa, in alternation.

43 Claims, 48 Drawing Figures

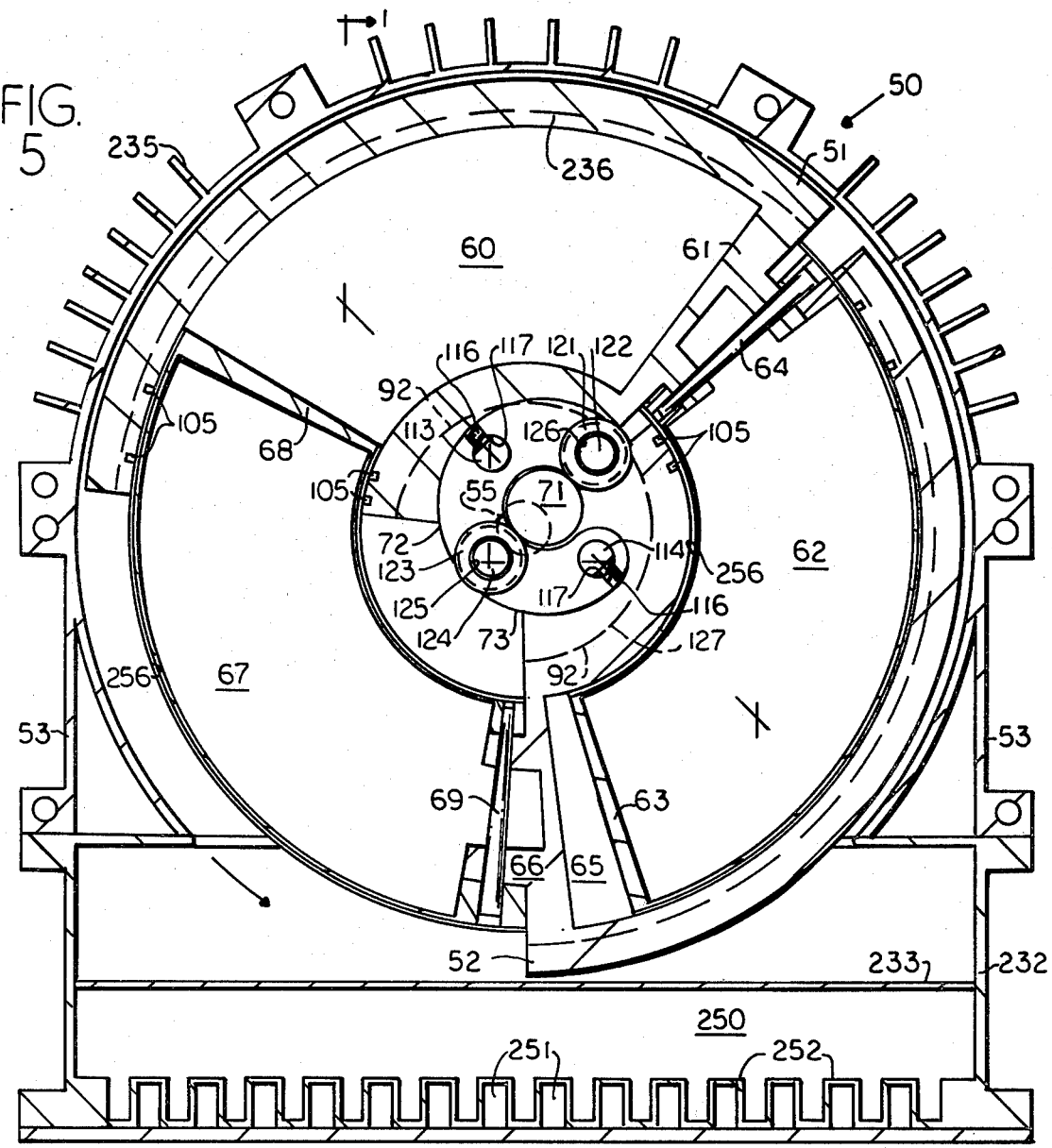
FIG. 5
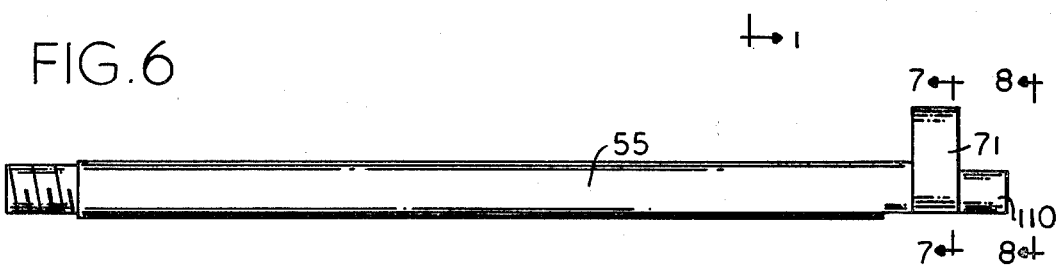
FIG. 6
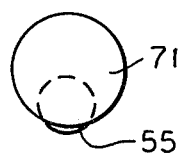
FIG. 7
FIG. 8

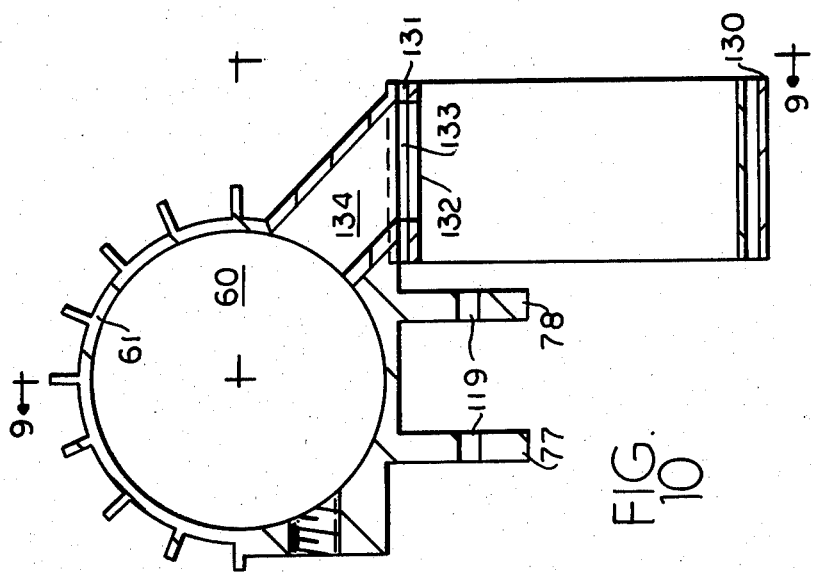
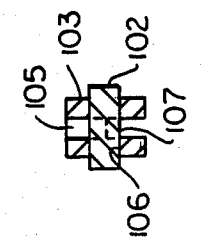
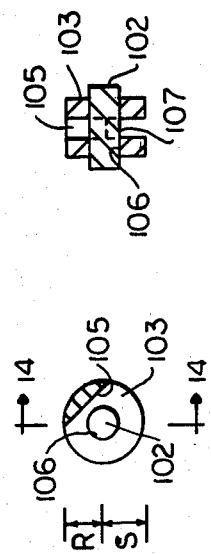
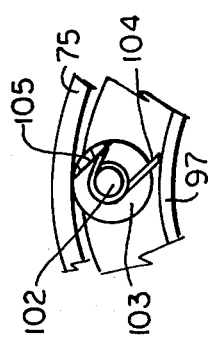
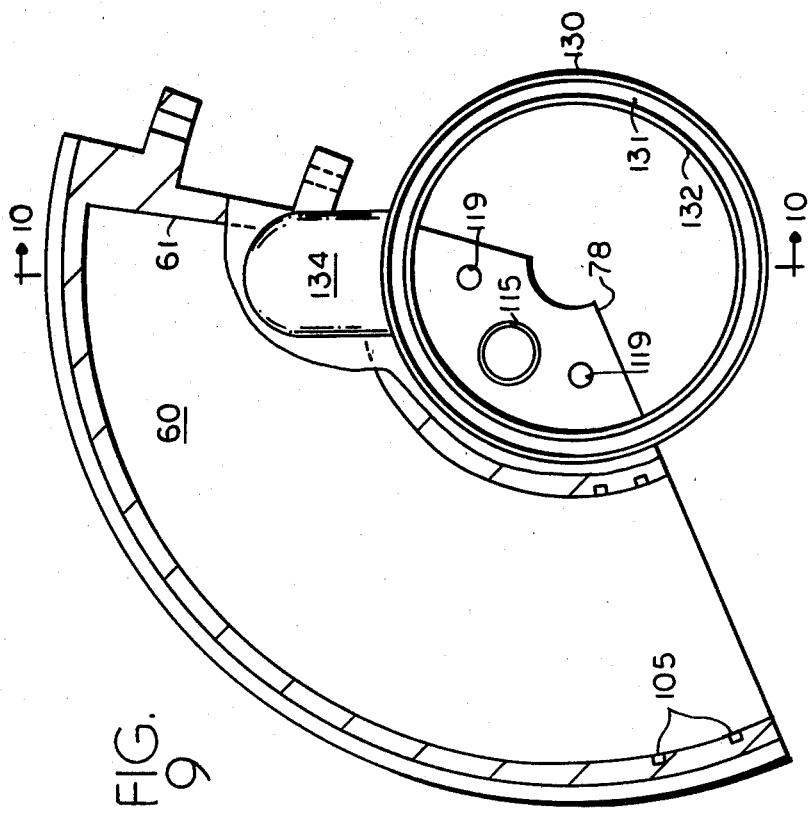
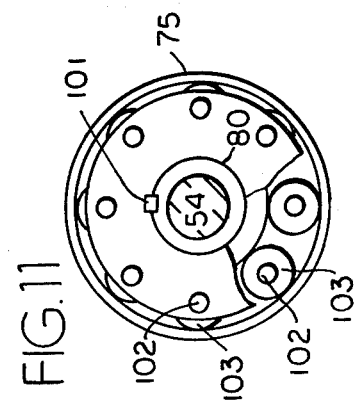

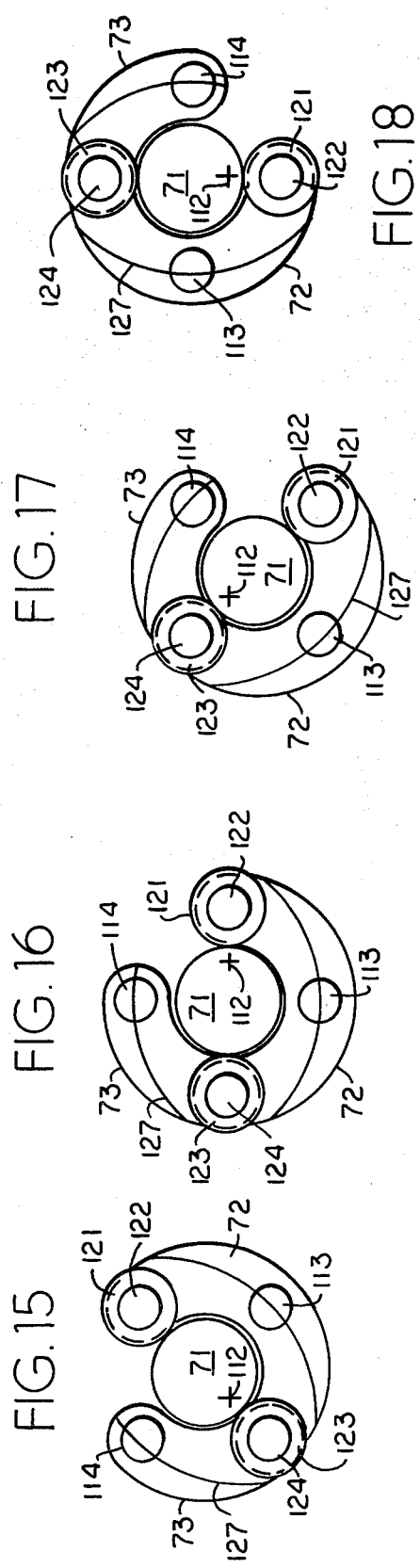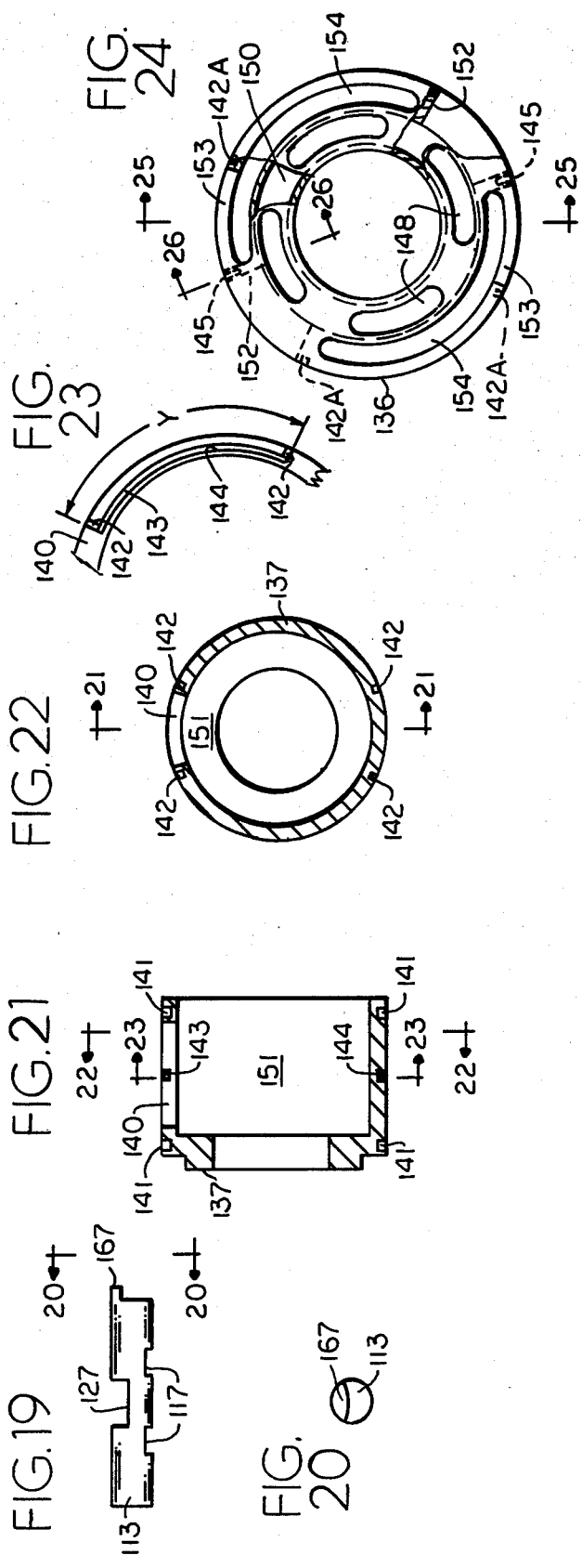

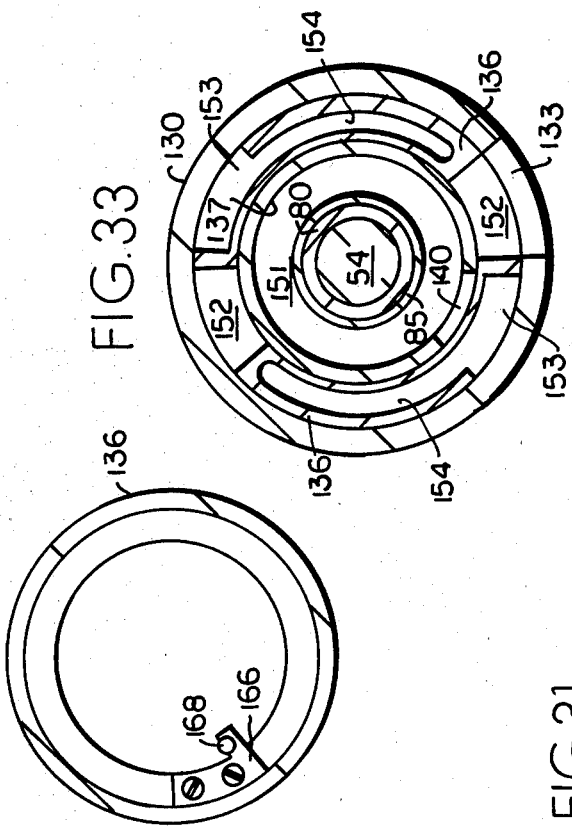
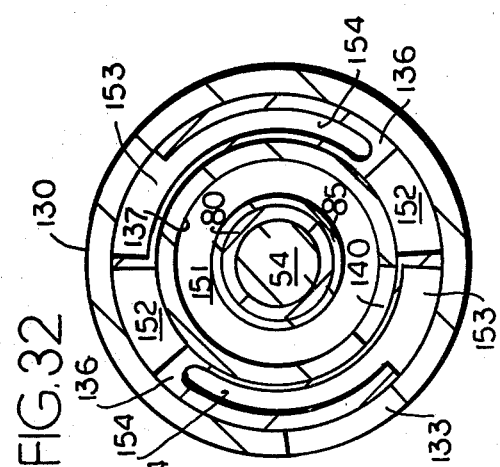
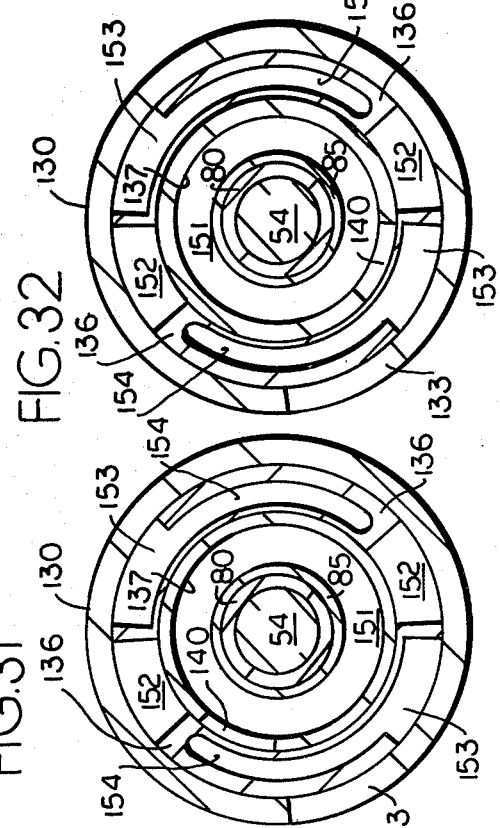
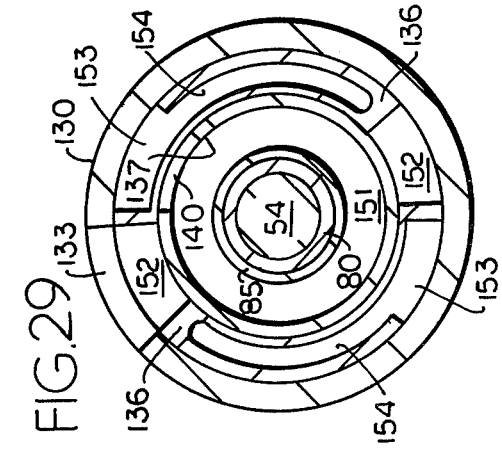

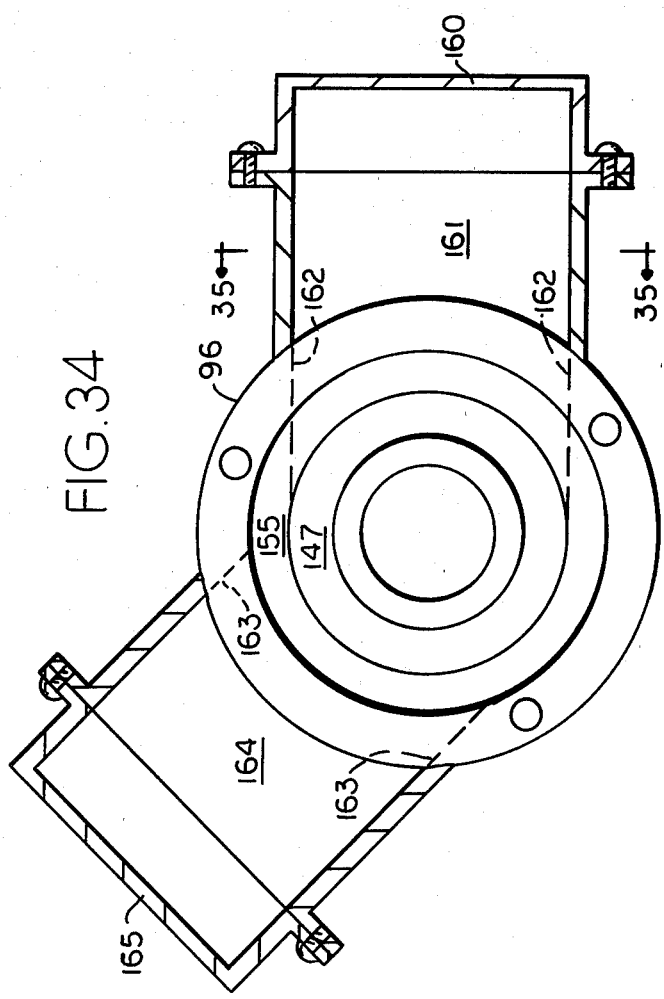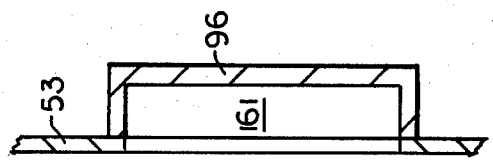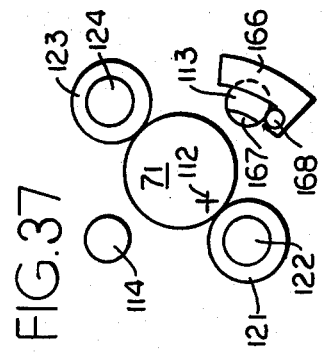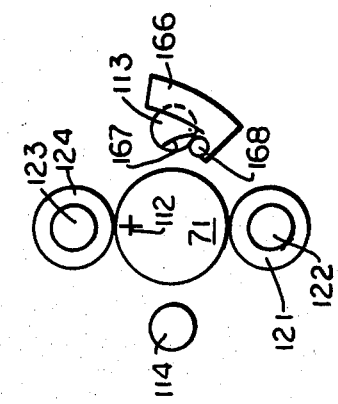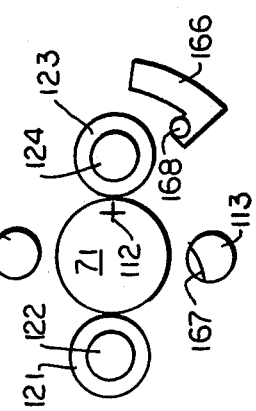

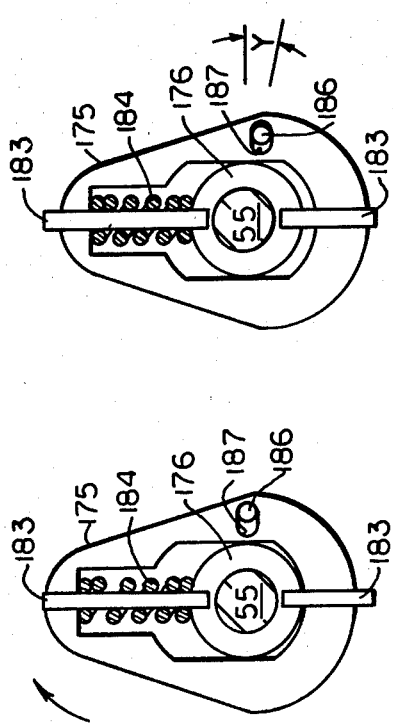

ROTATING PISTON ENGINE WITH CONSTANT TORQUE ARM DRIVE OF ITS POWER TAKE-OFF SHAFT

BACKGROUND OF THE INVENTION

This invention relates to an improved internal combustion rotary piston engine and to operative components therein.

The invention addresses the problem of increasing the overall efficiency of an internal combustion engine by mechanical construction. It also addresses other long-standing problems, as explained in connection with setting forth the following objects.

One important object of this invention is to provide an engine that can lessen fuel consumption while maintaining a given amount of output power. The machine of this invention accomplishes this object by the utilization of a constant torque arm, which is physically achieved by a rotary piston structure that does not change linear motion to circular rotation, as do the conventional forms of Otto and Diesel engines. The engine of this invention needs no crankshaft to accomplish its purpose, and great torque advantages are gained.

A further object of this invention is to utilize this greater torque for fuel savings, while also greatly reducing the mass of the engine. It eliminates many components usually found in internal combustion engines, including the crankshaft, the conventional intake and exhaust valves, the valve lifters, the cam shafts, the timing chains, the rocker arms, the push rods, the water pump, etc.; thereby, it substantially reduces the mass of the engine. This reduction of mass helps to produce a greater ratio of output power to fuel consumed.

An additional object of the invention is to reduce engine friction. The removal of many components reduces friction proportionally. Few parts of this engine actually mate with each other, so that the number of areas where friction is generated is substantially reduced. There is also a total absence of piston slap, this absence being accomplished by the replacement of connecting rods with rigid pistons of constant torque arm value.

Another object of this invention is to reduce manufacturing costs. Since the torque output is much greater, two pistons may be used instead of four and receive the same torque output. By the elimination of the crankshaft and the mechanical parts already mentioned, the manufacturing cost of this engine can be reduced proportionally.

Another object of this invention is to obtain more useful power by the elimination of parts and the friction associated with them. By the removal of these components and the energy necessary to drive them, energy savings can be realized, for it then takes less energy to drive the output shaft.

Another object of this invention is to create a better air-cooling means for the engine. The cooling efficiency of air-cooled engines is related to the density of the atmosphere. The engine of this invention is cooled both within its interior and around the exterior, thereby doubling the cooling capacity and doing so efficiently. Engine bulk is reduced by not employing a water jacket for cooling, and this results in more useful power at the output shaft.

A further object of this invention is to produce an engine that automatically changes into a neutral mode whenever the speed of the load on the output shaft exceeds the speed of the output shaft, the engine thereupon idling while the load is doing the work.

A further object of this invention is to provide an internal combustion engine capable of meeting higher pollution standards. This object is primarily achieved by reduction in the amount of fuel consumed and by the higher amount of torque output.

Another object of this invention is to create an extremely light but powerful engine, so that more useful power can be provided to the output shaft.

Another object of this invention is to provide a reliable engine, one without complex and intricate parts, thereby lowering the cost of the engine. Further objects and advantages of the invention will appear from the following description of a preferred embodiment.

SUMMARY OF THE INVENTION

The internal combustion engine of this invention is of the rotary piston type. The engine is equipped with two circular-arc, curved pistons with matching cylinders. The intent of this machine is to utilize the full advantages of torque and to delete wasted energy attributed to current engines which incorporate a crankshaft. Since the cylinders and pistons rotate in a circular fashion, full advantages of torque can be gained without the varying of torque arm length associated with a crankshaft. Therefore, much more power will be developed from a given amount of fuel.

Each rotary element comprises a piston and a cylinder, the piston that reciprocates in one cylinder being unitary with the other cylinder. Each piston and cylinder has a stroke of ninety degrees, one-quarter of a circle.

These piston-cylinder arrangements advance ninety degrees per stroke, but do so alternately. If one piston is advancing away from the closed end of a cylinder, the closed end of the opposite cylinder is advancing toward the piston of the previous cylinder. This intermittant rotation has a limited stroke of ninety degrees, and in a four-cycle engine both cylinder-piston arrangements must go through four strokes to accomplish one revolution of the power take-off shaft. The four-stroke engine may utilize the Otto cycle or the Diesel cycle for its operation.

The two interengaging piston-cylinder assemblies move around a circle on an engine plane. The power take-off shaft is on one side of that plane, while a flywheel shaft coaxial with the power take-off shaft lies on the other side of the plane, a flywheel mounted thereon.

Each piston-cylinder assembly has two separate hollow rotary support shafts, one on each side of said plane, each rigidly attached to its piston-cylinder assembly. The two support shafts on the take-off side of the plane are concentric with the take-off shaft and surround it, the shaft for one piston-cylinder assembly surrounding that for the other; these three shafts are rotatable relative to each other and support each other. The two support shafts on the flywheel side of the engine plane are concentric with the flywheel shaft and surround it, the shaft for one piston-cylinder assembly surrounding that for the other; these three shafts are rotatable relative to each other and support each other.

A stationary engine casing surrounds the piston-cylinder assemblies and the support shafts; it provides bearings to support the flywheel shaft and the power take-off shaft, which extend out therefrom in opposite directions.

A first clutching system on the power take-off side of the engine plane is used to clutch each of the support shafts on that side of the engine plane to the power take-off shaft, doing so alternately, so that only one support shaft is clutched to the power take-off shaft at a time. This first clutching system assures rotation of the power take-off shaft in a single direction and also assures rotation of each piston-cylinder assembly in a single direction.

A second clutching system on the flywheel side of the engine plane is used to clutch each of the support shafts on that side of the plane to the stationary casing and to prevent reverse rotation of those support shafts.

These two clutching systems employ clutching spools with spring-loaded, pin-mounted cogs that freely permit shaft rotation in one direction but prevent rotation in the opposite direction.

A transmitting system imparts drive from the piston-cylinder assemblies to the flywheel shaft and vice versa. This transmitting system includes a bell crank and a pivot arm pivoted together, with the bell crank pivoted to one piston assembly and the pivot arm to the other, and they mount rollers that engage a thrown cam forming part of the flywheel shaft.

The flow of air and fuel into the engine and the exhaust flow therefrom call for a novel system of porting that is timed by the engine itself. No poppet valves, timing cams, and so on are needed, and none are used. A novel system for correction of position errors in the synchronization of the intake-exhaust exchangers with the cylinders is provided.

A novel engine timing and ignition system and the lubrication and cooling of the engine are explained below.

BRIEF DESCRIPTION OF THE DRAWINGS

FIG. 5 is a view in section taken along the line 5—5 in FIG. 1.

FIG. 6 is a detailed view of the flywheel shaft in side elevation to show a thrown cam not seen fully in FIGS. 1 and 4.

FIG. 7 is a view in section taken along the line 7—7 in FIG. 6.

FIG. 8 is an end view looking along the line 8—8 in FIG. 6.

FIG. 9 is a view partly in section taken along the line 9—9 in FIG. 10.

FIG. 10 is a view partly in section taken along the line 10—10 in FIG. 9.

FIG. 11 is a view in section taken along the line 11—11 in FIG. 1.

FIG. 12 is a fragmentary enlarged view in section taken along the line 12—12 in FIG. 1.

FIG. 13 is a view in elevation of the cog of FIG. 12.

FIG. 14 is view in side elevation of the cog of FIG. 13 looking in the direction 14—14 in FIG. 13.

FIG. 15 is an enlarged fragmentary end view looking along the line 15—15 in FIG. 1.

FIGS. 16, 17, and 18 are views similar to FIG. 15 with the parts in different rotational positions.

FIG. 19 is a detail view in elevation of a swing pin shown in FIGS. 1 and 4.

FIG. 20 is a view in section taken along the line 20—20 in FIG. 19.

FIG. 21 is a view in section taken along the line 21—21 in FIG. 22.

FIG. 22 is an end view looking along the line 22—22 in FIG. 21.

FIG. 23 is a fragmentary view in section taken along the line 23—23 in FIG. 21.

FIG. 24 is a view in section taken along the line 24—24 in FIG. 1 and looking from the right in FIG. 25.

FIG. 25 is a view in section taken along the line 25—25 in FIG. 24.

FIG. 26 is a view in section taken along the line 26—26 in FIG. 24.

FIG. 27 is an enlarged view in section taken along the line 27—27 in FIG. 25 but containing also some other inner elements. The ratchet teeth, which go completely around a full circle, are indicated partially by dot-dash lines.

FIG. 28 is an end view looking along the line 28—28 in FIG. 25.

FIGS. 29, 30, 31, 32, and 33 are views similar to FIG. 24 but with different rotational positions of certain parts shown.

FIG. 34 is a view in section taken along the line 34—34 in FIG. 1.

FIG. 35 is a view in section taken along the line 35—35 in FIG. 24.

FIG. 36 is a view in section taken along the line 36—36 in FIG. 1.

FIGS. 37 and 38 are views similar to FIG. 36 showing different rotational positions.

FIG. 39 is a view in section taken along the line 39—39 in FIG. 1.

FIG. 40 is a view similar to FIG. 39 showing the parts in a different relative position.

FIG. 41 is a view in section taken along the line 41—41 in FIG. 1.

FIG. 42 is a view in section taken along the line 42—42 in FIG. 41.

FIGS. 43, 44, 45, 46, and 47 are end views of the points and distributor cam taken along the line 41—41 in FIG. 1, omitting the flange of the breaker cam and showing different rotational positions. Some parts shown in FIG. 43 are omitted from FIGS. 44-47.

FIG. 48 is an end view of the three shafts on the right-hand side of FIG. 1, taken along the line 24—24 and showing a conductor bar.

DESCRIPTION OF A PREFERRED EMBODIMENT

Figure 1:
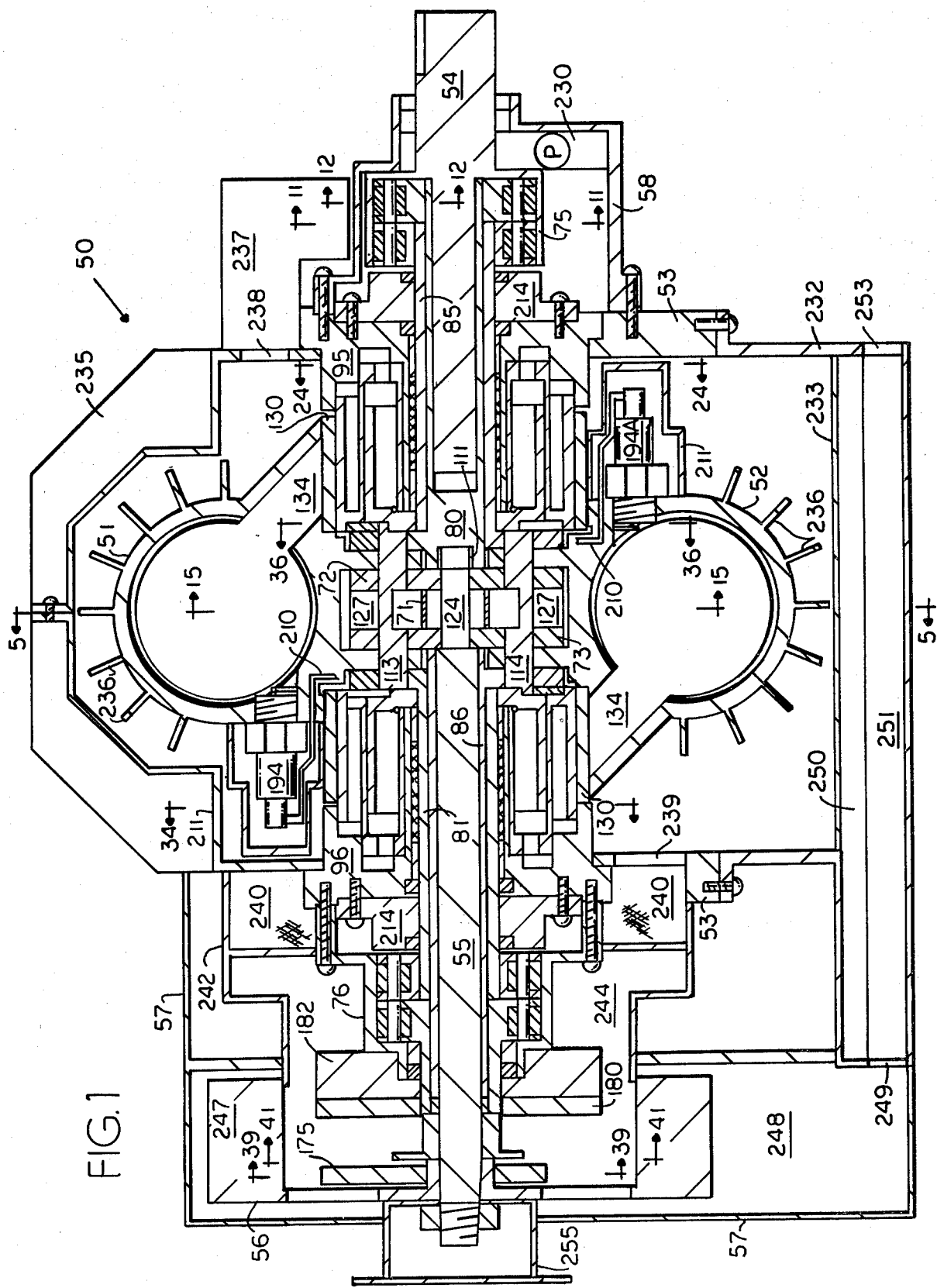
FIG. 1 is a view in elevation and section taken along the line 1—1 in FIG. 5, altered to show nearly all the parts of the engine in their appropriate positions. Thus, the spark plug, plug cover, intake-exhaust port, and conductor bar at the bottom of FIG. 1 are drawn in only to show their appropriate position; they would not otherwise be seen in this view, since they would fall to the left of the sectional line 1—1 in FIG. 5.

Basic structure and operation (FIGS. 1 and 5)

As stated previously and as shown in FIGS. 1 and 5, the engine 50 of this invention is of the rotary piston-cylinder type. It is a two-cylinder engine with two rotary piston-cylinder assemblies 51 and 52 which revolve around a common center, each having a limited stroke of ninety degrees. Both of the assemblies 51 and 52 are located inside the crankcase 53. Each of them drives a power take-off shaft 54 (shown at the right in FIGS. 1 and 3) and a flywheel shaft 55 (also see FIG. 2) carring a flywheel 56 (shown at the left of FIGS. 1 and 2), in a manner that will be described below. The flywheel shaft 55 extends well outside the crankcase 53, and it and the flywheel 56 lie within a casing 57 that is joined to the crankcase 53. On the other side of the engine 50 a casing 58 is joined to the crankcase 53 and surrounds a portion of the power take-off shaft 54.

When one piston-cylinder assembly 51 is in motion, the opposite assembly 52 is at rest, and vice versa. Since each stroke is one-quarter of a circle or ninety degrees, it takes four strokes for each assembly to complete a full three hundred sixty degrees. However, when both assemblies 51 and 52 have rotated through 360°, there have been *two* four-stroke cycles for each assembly 51 and 52; for while one cylinder-piston assembly is at rest, the other is in motion, and the four-stroke engine cycle involves alternate rotations, two strokes each of the two separate piston-cylinder assemblies 51 and 52. Conversely, for every three hundred sixty degree rotation achieved by each piston-cylinder assembly 51 or 52, each piston-cylinder assembly has gone through two four-stroke engine cycles while completing its own four strokes. Consequently, the engine 50 operates as a four stroke engine, with an intake stroke, a compression stroke, a power stroke, and an exhaust stroke, for each piston-cylinder assembly 51, 52. Two different strokes are always occuring at the same time. For the purposes of clarity and since the two piston-cylinder assemblies 51 and 52 are identical, being merely out of phase with each other and left and right hand, a complete description of one serves as a complete description of the other.

As shown in FIG. 5, the first piston cylinder assembly 51, comprises a first cylinder 60 joined near its head 61 to a hollow piston 62 having a head 63. A taper lock pin 64 secures the cylinder 60 and piston 62 together. Similarly, a second cylinder 65 is joined near its head 66 to a hollow piston 67 having a head 68, the joining being by means of a taper lock pin 69 identical to the pin 64. Assuming that the first cylinder 60 moves in FIG. 5 in a counterclockwise direction while the piston 67 and the second cylinder 65 remain idle, then the piston 67 simultaneously closes toward the closed end 61 of the first cylinder 60. This means that the cylinder 60 and the piston 67 are in either their exhaust stroke or their compression stroke. When the cylinder 60 advances counterclockwise ninety degrees or to the extent of its limit of travel, it stops, and then the second cylinder 65 and the piston 67 advance counterclockwise ninety degrees, or a quarter of a circle, to the extent of their travel, while the first cylinder 60 and its piston 62 remain at rest.

This sequence continues indefinitely. The extent of piston-cylinder travel is governed by several components, primarily a thrown cam 71 on the flywheel shaft 55 (see FIGS. 4-8), a bell crank 72, and a pivot arm 73. These components work together to prevent cylinder overrun and also to provide cylinder carry-through for non-power strokes and during misfire or throttle-down. Later these components and others related to them will be described thoroughly. First, however, the engine drive system will be discussed.

The Support Shafts

(FIGS. 1-5, 9, and 10)

Figure 2:
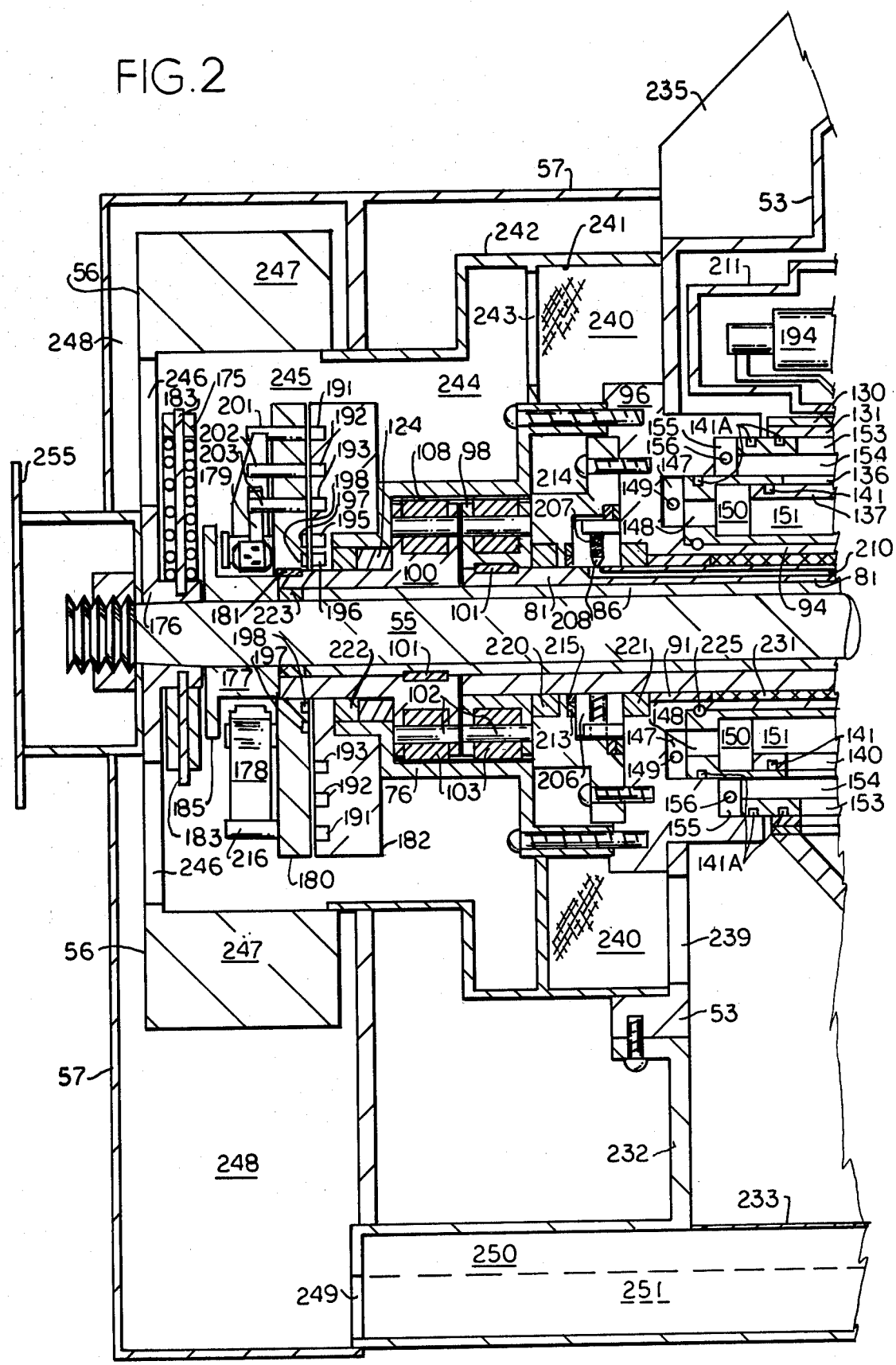
FIG. 2 is an enlargement of the left-hand portion of FIG. 1.
Figure 3:
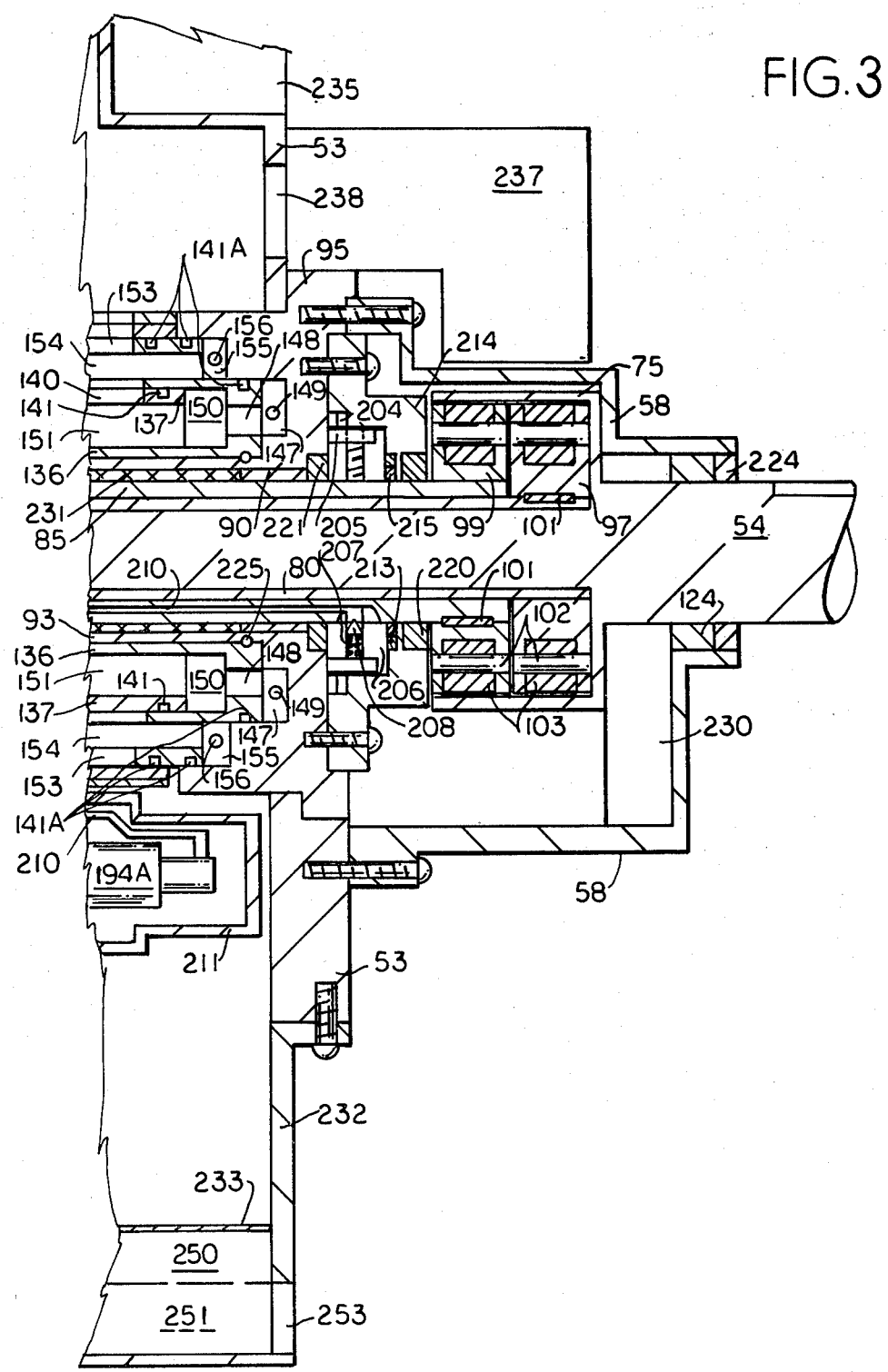
FIG. 3 is an enlargement of the right-hand portion of FIG. 1.

The cylinders 60 and 65 advance the power take-off shaft 54 by a clutching system that operates inside a drum 75 that is a part of the power take-off shaft 54 (see FIGS. 1 and 3). On the other side of the engine 50, the cylinders 60 and 65 are connected to a clutching system inside a drum 76 (FIGS. 1 and 2), for a different purpose that will be explained in the following section.

Figure 4:
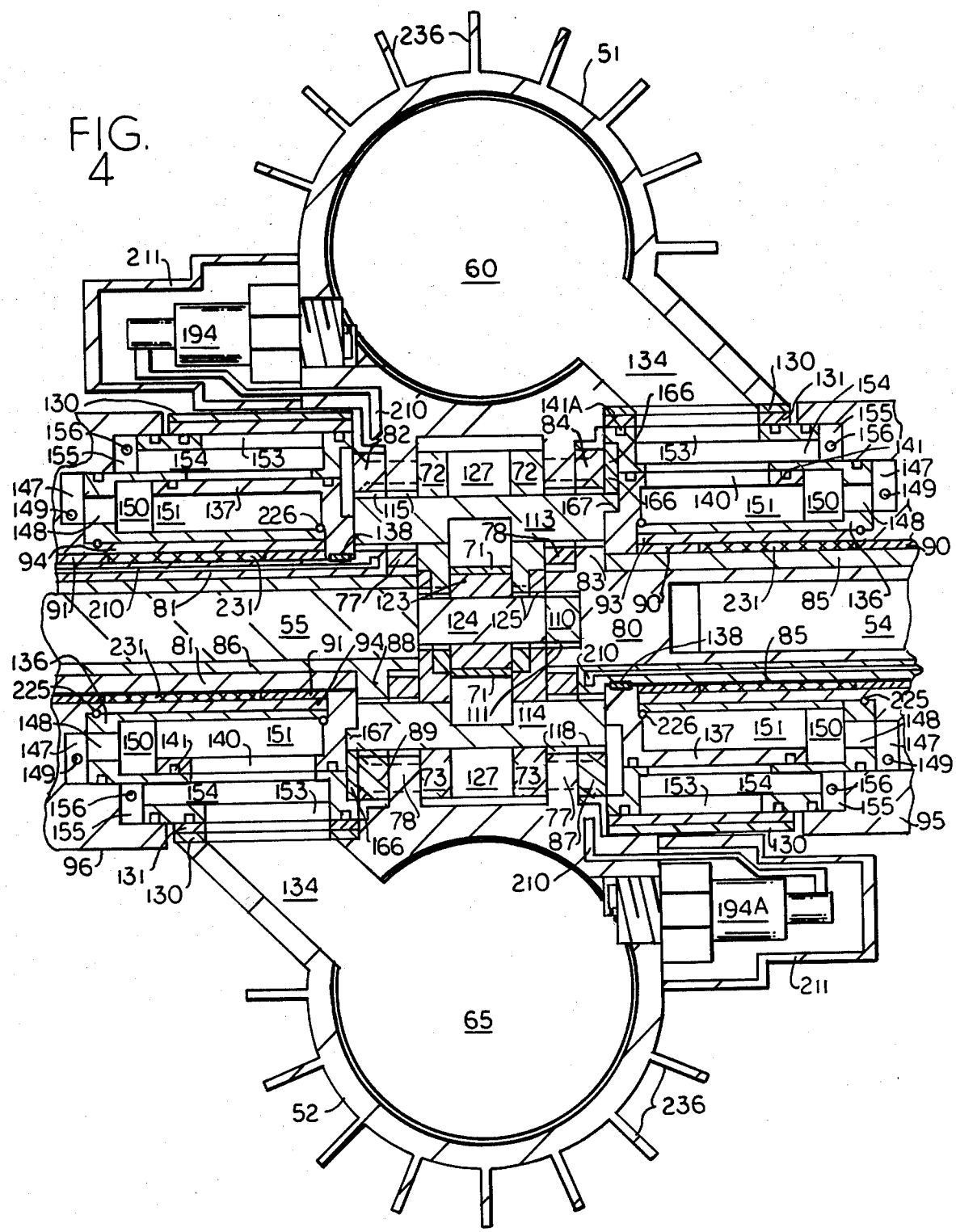
FIG. 4 is an enlargement of the center portion of FIG. 1.

As shown in FIGS. 1, 4 and 9, and especially in FIG. 10, each piston-cylinder arrangement 51 and 52 has a pair of flanges 77 and 78. Each of these flanges 77 and 78 is secured to a mating flange which is part of a hollow or partly hollow support shaft, there being several such shafts, all coaxial with the shafts 54 and 55 and each concentric with one of them.

Thus, the first cylinder 60 is supported by a partly hollow support shaft 80 on the same side of the engine as and surrounding a lengthwise portion of the power take-off shaft 54 and also by a hollow support shaft 81 on the same side of the engine as the flywheel shaft 55 and surrounding a lengthwise portion thereof; the flange 77 of the cylinder 60 is secured to a flange 82 of the shaft 81 by machine screws 84 and the flange 78 of the cylinder 60 is secured to a flange 83 on the shaft 80 by machine screws 84.

Similarly, the second cylinder 65 is supported by a hollow support shaft 85 on the same side of the engine as the take-off shaft and by a hollow support shaft 86 on the same side of the engine as the flywheel 56; in this instance, the flange 77 of the cylinder 65 is secured to a flange 87 on the shaft 85 by machine screws 89, and the flange 78 is secured to flange 88 of the shaft 86 by machine screws 89.

The shaft 80 slides within the shaft 85, and the take-off shaft 54 slides within the shaft 80. Similarly, the shaft 86 slides within the shaft 81, and the flywheel shaft 55 slides within the shaft 86. The three shafts 54, 80, and 85 are concentric, and the inner shafts bear on the outer ones; the three shafts 55, 86 and 81 are concentric, the inner shafts again bear on the outer ones. The outer shafts 81 and 85 operate within respective main bearings 90 and 91 (FIGS. 1 to 4). On the power take-off shaft 54 side of the engine, the main bearings 90 support the outer shaft 85, which, in turn, supports the intermediate shaft 80, which, in turn, supports the power-take-off shaft 54. On the flywheel 56 side of the engine, the main bearings 91 support the outer shaft 81, which supports the intermediate shaft 86, which supports the flywheel shaft 55.

Thus, each cylinder 60 and 65 is supported by two shafts 80 and 85 or 81 and 86, in all instances by the securing together of the flanges 77 and 78 to the flanges 82, 83 and 87, 88. Each shaft flange 82, 83, 87, and 88 has an azimuth distance of ninety degrees, and when these flanges are bolted to the flanges 77 or 78 of the appropriate cylinders 60 and 65, they provide a common center of rotation for the piston-cylinder assemblies 51 and 52. The flanges operate in line, since the piston-cylinder assemblies 51 and 52 never pass each other. Boundaries of the flanges on the support shafts are shown by a broken line 92 in FIG. 5.

The radially outer support shafts 81 and 85 support opposite sides of different piston-cylinder assemblies 51 and 52, respectively, and the inner support shafts 80 and 86 also support opposite sides of different piston-cylinder assemblies 51 and 52 respectively; therefore, the means for supporting each piston-cylinder assembly 51 and 52 is comprised of one outer shaft 81 or 85 operating within the main bearings 90 or 91 and one inner shaft 80 or 86 operating inside the other cylinder's outer shaft 81 or 85. The main bearings 90 and 91 are supported by respective housing sleeves 93 and 94 each of which is part of a crankcase end closure member 95 and 96, which are secured to the opposite ends of the crankcase 53.

The Clutching System (FIGS. 1-14)

An important feature is that each piston-cylinder assembly 51, 52, acting through the support shafts 80, 81, 85 and 86 drives two clutching spools 97, 98, 99 and 100 respectively, one for each shaft and one each on each side of the perpendicular center of the engine 50. Each shaft 80, 81, 85, 86 is keyed to its clutching spool 97, 98, 99 or 100 by a key 101. The clutching spools 97 and 99 provide the clutching means by which the shafts 80 and 85 respectively, drive the power take-off shaft 54 in a manner allowing only *advancement* of the drum 75 to occur, in other words, to rotate the shaft 54 in one direction only. In a somewhat different manner, explained in the following section, the spools 98 and 100 assure unidirectional rotation of the flywheel shaft 55. Each piston-cylinder assembly 51, 52 is thus linked by one support shaft 80 or 85 to one clutching spool 97 or 99 for driving the take-off shaft 54 and by another support shaft 81 or 86 to one clutching spool 98 or 100 in the drum 76.

To summarize this point, each of the four hollow support shafts 80, 81, 85, and 86 that support the piston-cylinder assemblies 50 and 51 is keyed to a clutching spool 97, 98, 99 or 100 on one side or other of the engine 50. Each support shaft 80, 81, 85, and 86 has one clutching spool 97, 98, 99 and 100, and one of each lies on each side of the engine 50.

There are two clutching spools 97, 99 and 98, 100 in each of the two drums 75 and 76, respectively.

The drum 76 is stationary, being secured to the crankcase closure member 96, which is rigidly secured to the crankcase 53. The drum 75 is part of the power take-off shaft 54 and rotates with it. FIGS. 2, 3, and 11 show that pins 102 secure generally cylindrical cogs 103 to each of the clutching spools 97, 98, 99, and 100. All four spools 97, 98, 99, and 100 have identical cog mechanisms, each spool preferably utilizing eight cogs 103. Each cog 103 is mounted rotatably but off-center on its own pin 102. FIG. 11 shows one clutching spool 97, which is keyed to its support shaft 80 by means of a key 101; the power take-off drum 75 mates with the cogs 103 secured to the clutching spool 97.

FIGS. 12, 13, and 14 show in more detail the construction of the cogs 103 and how they function. As seen in FIG. 12, a spring 104 exerts force against a shoulder 105 of a cog 103 and against the internal hub of the spool 97, urging the cog 103 on its retaining pin 102 in a counterclockwise direction. The cogs 103 in the clutching spools 98 and 100 on the left side of the engine 50 (as seen in FIGS. 1 and 2) are spring loaded oppositely or in opposite hand with respect to their counterpart cogs 103 in the spools 97 and 99 on the right side of the engine.

The off-center mounting of each cog 103 is seen in FIG. 13, a dimension S from the bottom of the cog 103 to the center of the retaining pin 102, being greater than a dimension R from the center of the pin 102 to the top of the cog 103. A bore 106 in the cog 103, which receives the pin 102, is located off center, as can be seen by comparing the dimensions R and S in FIG. 13. An inclined plane is thus formed from the top dead center of the cog 103 around its periphery to bottom dead center. When the cog 103 is rotated on its retaining pin 102, the larger radius S in FIG. 13 is turned upwardly to occupy the space of the smaller radius R, doing so in a tapered manner, with the degree of slope of the taper being determined by the difference between the dimensions R and S. The cog 103 has a recess 107 in between its ends, as shown in FIG. 14, to provide clearance for the spring 104 and also to provide the anchoring shoulder 105 for spring-loading the cog 103 in the desired direction.

FIG. 11 shows that if the power take-off drum 75 were stationary and if the clutching spool 97 were to be rotated clockwise, then the inclined plane of each of the cogs 103 would wedge tightly against the internal bore of the drum 75. Since each cog 103 is spring loaded, it is held continuously by the spring 104 in a position which prevents the cog 103 from rotating further. This "dead" position means that any movement of the spool 97 in a direction opposite to the spring-loading of the cogs 103 instantly locks the cogs 103 to the drum 75. A similar locking occurs within the drum 76, which is always stationary.

Since each piston-cylinder assembly 51, 52 has one clutching spool in the stationary drum 76 and another in the power take-off drum 75, backward rotation of either piston-cylinder assembly 51, 52 is checked in the stationary drum 76 while any forward rotation of either piston-cylinder assembly 51, 52 will rotate the drum 75, which is part of the power take-off shaft 54. The spring loading of the cogs 103 when looking from the perpendicular center line of the engine 50 outward, is the same, so that the cogs 103 in the stationary drum 76 instantaneously stop any backward rotation of the shafts 81 or 86, due to the "dead" position of the cogs 103. This "dead" position of the cogs 103, allows only minute amounts of rotation to occur in a direction opposite to piston-cylinder travel, while the cogs 103 in the drum 75 advance the drum 75 simultaneously with any forward rotation of either piston-cylinder assembly 51 or 52. At any one time during operation, one spool is stationary in each drum and the other spool is in motion. This occurs because as one piston-cylinder assembly 51, 52 advances, the other is at rest, the one at rest being checked for movement in the stationary drum 76.

It is irrelevant whether the spool 97 or 99 is moving clockwise to lock the cogs 103 against the inside bore of the drum 75, or whether the spool 97 or 99 is stationary and the drum 75 is rotated counterclockwise; the result is the same. As can be seen in FIG. 11, if the clutching spool 97 were temporarily stationary and if the drum 75 were advancing clockwise, the spring-loaded cogs 103 would remain in a "dead" position, and friction between the cogs 103 and the inside of the drum 75 would merely work the cogs 103 against the loading of the spring 104 just enough to enable free rotation of the drum 75. This means that the drum 75 can be driven by one clutching spool 99 while the other clutching spool 97 is at rest, and vice versa. The cogs 103 and the clutching spools 98 and 100 in the stationary drum 76 follow the same principle, and although the drum 76 is stationary, the spools 98 and 100 can advance in the direction of shaft rotation, but cannot reverse. Therefore, reverse motion of either piston-cylinder assembly 51 or 52 is checked by the stationary drum 76, the clutching spools 98 and 100, and the cogs 103 located within them. All advancement of the power take-off shaft 54 is driven by the clutching spools 97 and 99 and the cogs 103, all located within the drum 75. It should be mentioned again that only one piston-cylinder assembly 51 or 52 is in motion at any given time.

As seen in FIGS. 1 to 5, when ignition occurs in the space between the piston 62 and the second cylinder 65, the piston 62 advances the shaft 81, due to slippage of the cogs 103 in the stationary drum 76, and this allows forward movement. This ignition, at the same time, advances the shaft 80 which rotates the clutching spool 97 inside the drum 75 and therefore drives the power take-off shaft 54. Backward travel of the second cylinder 65 and its piston 67 is checked by its support shaft 86, which operates the clutching spool 100 inside the drum 76 and does not allow reverse travel. The cogs 103 on the clutching spool 99 that is located on the shaft 85 operating inside the drum 75 allow slippage to occur, so that the drum 75 turns until the end of the stroke. After that the shafts 80, 81, 85, and 86 do identically the same thing but oppositely; i.e., the shafts which were in motion come to rest and so do their clutching spools; the shafts and clutching spools that were at rest, go into motion, and begin the following stroke. This sequence occurs once every stroke and continues indefinitely. A removable wearstrip or liner, such as the liner 108 in FIG. 2 may be located in either of the drums 75 or 76 or in each of them, and replaced in the event of abnormal wear.

Flywheel and Cylinder Drive
(FIGS. 1-6, 9, 10 and 15-20)

Nearly all the moving parts within the engine 50 are free-moving bodies, linked physically to no other part or to a fixed reference point somewhere on the crankcase 53. Each piston-cylinder assembly 51 and 52 is supported by two independent shafts and is completely free of the other piston-cylinder assembly, being linked only by the bell crank 72 and pivot arm 73. Since there is no given point of reference, the engine 50 is designed to compensate for accumulated error, as will be discussed in the following section. If the piston-cylinder assemblies 51 and 52 are independent and are not connected physically, some form of governing is needed to prevent one piston-cylinder assembly from running into the other. Also, some way must be provided to keep the piston-cylinder assemblies moving in the absence of a power stroke or during throttle down. This section deals with those problems.

One independent component is the flywheel shaft 55, occupying the internal bore of the support shaft 86. The shaft 55 rigidly supports the flywheel 56 and (FIG. 6) carries the thrown cam 71 and a secondary shaft support portion 110. The secondary support portion 110 rotates inside a bushing 111 (see FIG. 4) which is pressed into the support shaft 80. Since the flywheel shaft 55 operates inside the support shaft 86, it shares a common center line with the other shafts 54, 80, 81, 85, and 86 and with the piston-cylinder assemblies 51 and 52. The flywheel 56 is used to store kinetic energy for use during non-power strokes.

The shaft 55 is in no way linked to the power take-off shaft 54, and it operates independently from it. As can be seen in FIGS. 15-18, the thrown cam 71 is rotated into different positions, being turned by operation of the bell crank 72 and pivot arm 73. A reference crossing 112 corresponding to the true center of the shaft 55, the common center of all the rotating shafts 54, 55, 80, 81, 85, and 86, shows the effect of rotation on the positioning.

FIGS. 1, 4, and 5 show that the bell crank 72 is pinned to the first cylinder 60 and to its support shafts 80 and 81 by means of a swing pin 113, and the pivot arm 73 is pinned to the second cylinder 65 and its support shafts 85 and 86 by means of a swing pin 114. FIGS. 19 and 20 show a more detailed drawing of the swing pin 113, which is identical to the swing pin 114. Each of these pins 113 and 114 rotates within a pair of bushings 115 and 118 shown in FIG. 4 and is retained in a fixed position relative to the pivot arm 73 or bell crank 72 by set screws 116 shown only in FIG. 5, locking into notches 117 in the pins, the notches 117 being shown in FIG. 19. The set screws 116 not only lock the swing pins 113 and 114 in a predetermined rotational position relative, respectively, to the pivot arm 73 and the bell crank 72; they also prevent the pins 113 and 114 from being moved lengthwise. Physically, the swing pins 113 and 114 thus become part of the bell crank 72 and the pivot arm 73, respectively, rotating within their bushings 115 and 118.

As shown in FIG. 10, the flanges 77 and 78 which support the cylinders 60 and 65 on the support shafts, 80, 81, 85, and 86, each contain half of each bushing 115 the other half being contained in the flanges for those support shafts, so that the swing pins 113 and 114 can pivot back and forth in the bushings 115 and 118 during angular movement of the cylinders and support shafts relative to the bell crank 72 and to the pivot arm 73. FIG. 9 shows tapped holes 119 in the flange 78 (they are also in the flange 77) for the machine screws 84 and 89 (see FIG. 4) which secure the cylinders 60 and 65 to their support shafts 80, 81, and 85, 86.

FIGS. 15 and 16 show that when the swing pin 113 is moved by its cylinder 60 ninety degrees from the FIG. 15 position to the FIG. 16 position, the swing pin 113 moves the bell crank 72 and also moves a roller 121, a roller pin 122, a roller 123 and a roller pin 124. The roller pins 122 and 124 are rotatably mounted to the bell crank 72, and the rollers 121 and 123 are rigidly secured to their respective pins 122 and 124. The swing pin 114 retains its position relative to the cross 112, because it is secured to the cylinder 65, and backward movement is checked by the cogs 103 in the drum 76.

The flywheel 56 and the flywheel shaft 55 are rotated by the cylinders 60 and 65, alternately, through the thrown cam 71, by the application of leverage pressure to the high side of the thrown cam 71. This pressure is applied by means of the roller 121 or the roller 123, whichever is operating on the high side, both of which are always in approximate engagement (a clearance of 0.001 inch) with the thrown cam 71, as shown in FIGS. 5 and 15-18. Since the thrown cam 71 may be initially placed into motion by means of a starter or a pull rope, one can see that after ignition, one swing pin will remain at rest while the other advances, since each is attached by the bushings 115 or 118 to an opposite cylinder 60 or 65. In FIGS. 15-18, the rotation is clockwise. Ignition causing advancement of the piston 62 (FIG. 5) and its associated cylinder 60, advances the swing pin 113 in FIG. 15; then the swing pin 114, which is secured rotatably to the second cylinder 65 by the bushings 118, is checked along with the cylinder 65 and its associated piston 67, these being prevented by the cogs 103 from backward travel that would be induced by the reaction of ignition between the piston 62 and the cylinder 65. Therefore, the swing pin 114 remains idle while the swing pin 113 orbits counterclockwise in FIG. 5.

The pivot arm 73 and the bell crank 72 are hinged to the same roller pin 124 that secures the roller 123 so that the two are free to pivot or rotate partially around the pin 124. The roller pin 124 is secured to the roller 123 by a set screw which is not shown. This set screw, physically speaking, makes the roller 123 and the roller pin 124 a single unit, operating within bushings 125 (FIGS. 4 and 5). The hinging enables the two components 72 and 73 to be moved into different relative angular positions while the swing pins 113 and 114 orbit a common center. The roller 121 and roller pin 122 are similarly joined together and operate within bushings 126 (FIG. 5). The bushings 125 and 126 enable the roller assemblies 123, 124 and 121, 122 to spin freely while the bell crank 72 and the pivot arm 73 can pivot about the roller pin 124.

From FIG. 15 to FIG. 16, the swing pin 113 orbits around true center ninety degrees clockwise, while the swing pin 114 remains stationary. The movement of the first cylinder 60 and the piston 62 (FIG. 5) causes pressure to be applied by the roller 121 to the highest area above center on the thrown cam 71. While the swing pin 113 is being advanced ninety degrees along with the cylinder 60, the roller 121 moves with it, applying constant pressure to the thrown cam 71 until bottom dead center of the thrown cam 71 is reached. At this point, the swing pin 113 can advance no further, due to the limitations imposed by the roller 121, and since the swing pin 113 can advance no further, the cylinder 60 and the piston 62 come to rest.

However, the thrown cam 71 of the shaft 55 supporting the flywheel 56, is still in motion. When ignition then occurs between the cylinder 60 and the piston 67, the swing pin 114, which is linked to the cylinder 65 advances ninety degrees from FIG. 16 to FIG. 17. As it advances, the swing pin 113 and the cylinder 60 remain at rest, due to the clutching cogs 103 inside the drum 76, which prevent reverse travel. While the swing pin 114 advances ninety degrees, the roller 123 applies pressure to the high side of the thrown cam 71, forcing the cam 71 to revolve in the same direction as cylinder travel; until, once again, bottom dead center is reached on the thrown cam 71, as in FIG. 17.

After the two power strokes from FIG. 15 to FIG. 16 and from FIG. 16 to FIG. 17, it is the thrown cam 71 that rotates the cylinders 60 and 65. Since the swing pin 114 comes to rest with the second cylinder 65 in FIG. 17, the swing pin 113 must be advanced to rotate the first cylinder 60 and the piston 62 in the same direction of rotation as the flywheel 56. This is accomplished by the thrown cam 71 being driven by the flywheel 56 and remaining in motion, independent of the piston-cylinder assemblies 51 and 52.

Between FIGS. 17 and 18, the thrown cam 71 is therefore applying pressure to the rollers 121 and 123 instead of the rollers applying pressure to it. As the cam 71 rotates clockwise, the roller 123 is worked against the thrown cam 71. It can be seen in FIG. 17 that the height between true center, indicated by the cross lines 112 and the roller 123 must be increased to allow passage of the thrown cam 71. This action applies pressure to both of the swing pins 113 and 114. As the height of the roller 123 increases, the swing pin 113 is orbited clockwise, and the swing pin 114 would oribt counterclockwise, except that it is checked by the clutching spool 98 or 100 in the stationary drum 76, which prevents reverse travel. Rotation can thus only occur clockwise. Therefore, the thrown cam 71, by applying upward pressure on the roller 123, advances the swing pin 113 and the piston-cylinder assembly 51, ninety degrees, as in FIGS. 5 and 18.

This sequence occurs anytime when the flywheel 56 is setting the thrown cam 71 into motion, and the vice versa sequence occurs when the cylinders are inducing the thrown cam 71 into motion. The primary difference between the two motions is that when either cylinder 60 or 65 is driving the thrown cam 71, the driving is being done from the highest point of the thrown cam 71 to the lowest point of the thrown cam. When the flywheel 56 is driving the thrown cam 71, the pressure needed to move the cylinders 60 or 65 is being applied from the low side of the thrown cam 71 to the high side.

The assembly of the bell crank 72 and the pivot arm 73, as well as the swing pins 113 and 114, has a recess 127 (FIGS. 4, 15-19) which allows passage of the thrown cam 71. Since the thrown cam 71 revolves at a greater speed than do the cylinders 60 and 65 and the swing pins 113 and 114, clearance must be provided to allow passage of the thrown cam 71. For every ninety degrees of swing pin travel, the thrown cam 71 revolves two hundred twenty-five degrees, a two-and-a-half to one ratio. This ratio occurs because when the swing pins or piston-cylinder assemblies rotate ninety degrees, that movement is compounded by repositioning movement of the rollers 123 or 121 respectively. So, as can be seen, it is the pivot arm 73 and bell crank 72, plus components operating therein, that keep the cylinders 60 and 65 from overriding each other. Furthermore, it is these components that drive the flywheel shaft 55 to store kinetic energy until it is needed to drive the cylinders.

It should be stressed again that the flywheel 56 and the shaft 55 are the only items other than ignition mechanisms that are driven by the thrown cam 71, and these are independent of all other engine components. The two-and-a-half to one ratio enables the use of a lighter weight flywheel 56. It should be mentioned that the torque-arm value for rotating the flywheel 56 is the distance between the perimeter of the thrown cam 71 and the true center, and that this ratio is high while the cylinders 60 and 65 are turning the flywheel 56, but just the opposite is true when the flywheel 56 is turning the cylinders 60 and 65. This also helps to enable use of a lighter weight flywheel 56, thus reducing the weight of the engine 50, while storing adequate kinetic energy for non-power strokes.

It should be noted that the bell crank 72, the pivot arm 73 and the thrown cam 71 (FIGS. 1 and 4), all function through the center of mass, that is, directly in line perpendicularly with the center of the piston-cylinder assemblies, so that all energy necessary to drive either is equally distributed through the center of mass.

Engine Breathing: intake and exhaust flows (FIGS. 1-4, 9, 10, 21-26, and 29-35)

FIGS. 1, 9 and 10 show that a circular sleeve 130 is part of the cylinder 60 and that this sleeve 130 includes an internal transition sleeve portion 131, a metal sleeve portion 132, and a rectangular port 133 through the sleeve 130 and its portions 131 and 132. The port 133 leads into a round cylindrical passage 134 opening into the cylinder 60. The passage 134 is used for both intake and exhaust and is the only such passage leading into the cylinder 60, so that a more uniform cooling capability of the surrounding metal is incorporated. The rectangular port 133, co-operates with the round passage 134 and, governed by its length and its azimuth value, as in FIGS. 9 and 10, provides a transition area in the sleeve 131 to afford the cylinder 60 better breathing capabilities when the port 133 is nearly open or is nearly closed on a usually stationary intake-exhaust exchanger 136 discussed below.

Each cylinder 60 or 65 (see FIGS. 1 and 4) has an intake sleeve 137 (see also FIGS. 21 and 22) keyed by a member 138 to the outer support shaft 85, 81 of the opposite cylinder 65 or 60, for rotation with that support shaft. Thus, the intake sleeve 137 for the cylinder 60 is in motion any time the cylinder 65 is in motion, see FIG. 4, (since whenever one cylinder 60 is in motion, the opposite cylinder 65 is at rest). Since each cylinder 60, 65 is supported by a larger-diameter external shaft 81, 85 and a smaller-diameter internal shaft 80, 86, each cylinder 60, 65 has a shaft opposite the passage 134 and keyed to the intake sleeve 137 of the opposite cylinder 65, 60, by a key 138. FIG. 4 shows that the intake sleeve 137 operates inside the intake-exhaust exchanger 136 with a minimum amount of clearance around its circumference, sufficient to prevent drag between them. The intake sleeve 137 has an intake port 140 sealed off by circular rings 141 and horizontal vanes 142 (FIGS. 21 and 22), which engage the interior surface of the intake-exhaust exchanger 136.

The circular rings 141 provide their own spring tension, expanding outwardly to engage the internal bore of the intake-exhaust exchanger 136. Each of the four horizontal vanes 142 incorporates a spring 143 located within a groove 144, as can be seen in FIGS. 21 and 23. The spring 143, which may be a spring steel wire, exerts outward pressure against the horizontal vanes 142 and keeps them snugly engaged with the internal bore of the intake-exhaust exchanger 136.

The four vanes 142 (FIG. 22) and two circular rings 141 (FIG. 21), on each intake sleeve 137, provide four isolated areas around the perimeter of the intake sleeve 137, each partitioned off by a horizontal vane 142. One of these isolated areas include the port 140. The partitioned-off segments around the perimeter of the intake sleeve 137 thus enable the intake port 140 to supply the cylinder 60 with an intake fuel-air mixture at determined intervals.

Although the spring loading of the vanes 142 by the spring 143 is different from that of the spring loading of the two 'between port' vanes 145 by a spring 146 on the exchanger 136, shown in FIGS. 24 and 26, the vanes 142 are assembled in the same basic manner as the vanes 145 (FIG. 26), with minimum clearance between the vanes 142 or 145 and the circular rings 141 and 141a.

As can be seen in FIG. 24, there are six isolated areas around the perimeter of the intake-exhaust exchanger 136 provided by vanes 142a to prevent passage of compressed gases from one of these isolated areas to the other. FIG. 25 shows the circular rings 141a and FIG. 24 shows horizontal vanes 142a and 145. The 'between port' horizontal vanes 145 incorporate a spring 146 shown in FIG. 26 as partially collapsed by the insertion of the horizontal vane 145. The spring 146 keeps the horizontal vane 145 snug against the sleeve 132, which provides the internal bore of the sleeve 130 (shown in FIGS. 1, 4, 9, and 10) while the tension spring 143, shown in FIG. 23 keeps each of the four horizontal vanes 142a snugly mated with the sleeve 132 within the internal bore of the sleeve 130.

A circular intake port 147 for a fuel-air mixture lies within each closure plate 95 and 96 and extends in through the crankcase 53 (FIGS. 2-4) and opens into slotted passages 148 (see also FIG. 24) in an end wall of the exchanger 136 and from there into an internal bore 150 of the exchanger 136 (FIGS. 24 and 25), where the intake sleeve 137 operates. When the intake sleeve 137 (FIG. 21) is inserted into the internal bore 150 of the intake-exhaust exchanger 136 (see FIGS. 1-4, 24, and 25), a closed chamber 151 is created which empties into the rotary port 140. Thus, the intake fuel-air mixture travels from the conduit 149 into the circular intake port 147 through the passage 148 of the intake-exhaust exchanger 136, into the bore 150, and from there into the chamber 151 and into the rotary port 140. When the port 140 is fully or even partially aligned with a port or passage 152 in the exchanger 136, this intake mixture flows into the port 133 and from there via the passage 134 into the cylinder 60 (see FIG. 10).

FIG. 4 shows that each intake-exhaust exchanger 136 slips onto one of the sleeves 93 or 94, each which is part of one of the crankcase closure members 94 or 96 and which support the bearings 90 and 91. To simplify description, it will first be assumed that the intake-exhaust 136 does not move (and it normally is stationary) within the internal bore of the sleeve 132 (FIG. 10). With the intake-exhaust exchanger 136 stationary, the port 133 revolves with its cylinder 60 or 65 around the perimeter of the intake-exhaust exchanger 136 in the direction of cylinder travel. Thus the port 133 moves in ninety degree increments, the same as the length of each piston-cylinder stroke.

The intake-exhaust exchanger 136, as shown in FIGS. 24 and 25, also has a pair of exhaust ports 153 that leads exhaust gases from the port 133 into a slotted chamber 154. FIGS. 2-4 show that the chamber 154 leads to an annular chamber 155, which is formed within by the closure member 95 or 96, and from these exits through an exhaust duct 156. The two chambers 154 do not communicate with each other (FIGS. 24 and 25) but are separate chambers, nor do they communicate with the bore 150, which is the intake passage.

The exhaust passages 154 are sandwiched between incoming atmospheric cooling air (as will be explained later) and the intake fuel mixture, which enters through the chamber 150, thereby cooling the body of the intake-exhaust exchanger 136 and also cooling the support sleeves 93 and 94, as well as lessening the exhaust heat flow to the main bearings 90 and 91. Whenever the port 140 is in line or partially in line with the normally stationary port 152, intake gases can pass through them; but the gases can flow into the cylinder 60 and 65 only when the port 152 is in line or partially in line with the port 133 of the external sleeve 130 (FIG. 10). If the port 152 is in line with the port 133 and both are at rest, then as the port 140 rotates within the internal bore 150, the fuel-air mixture can enter into the intake-exhaust passage 134 and into the cylinder 60 or 65. By the same principle if the normally stationary port 153 is stationary and the port 133 revolves across it, exhaust gases can be displaced from the cylinder 60 or 65 into the passage 134, through the rotary port 133, and through the normally stationary port 153 into the chamber 154.

The chamber 154 empties into the circular chamber 155 and leaves the engine 50 through the exhaust conduct 156.

FIGS. 29–33 show the operating procedures. The horizontal vanes and circular rings have been omitted from these views to improve clarity and to reveal in detail the operation of the ports. During the sequences shown here, the port 133 communicates with the passage 134 and thus into or out from the cylinder 60 or 65.

FIG. 29 begins an intake stroke for the cylinder 60. From FIG. 29 to FIG. 30 the intake sleeve 137 for the cylinder 60 amd the intake port 140 revolve ninety degrees counterclockwise. In FIG. 29, the intake port 152 of the intake-exhaust exchanger 136 is directly in line with the port 133, and the sleeve 130 of the cylinder 60 is at rest. Since the opposite cylinder 65 is in motion, so is the intake sleeve 137 for the cylinder 60, the sleeve 137 being keyed to the support shaft 85 of the cylinder 65; thus the intake sleeve 137 rotates ninety-degrees with the shaft 85 from the FIG. 29 to the FIG. 30 position, while the cylinder 60 is at rest.

At the position shown in FIG. 30, the ninety-degree stroke has been completed, and the advancing cylinder 65 travels no further; therefore, the intake sleeve 137 for the cylinder 60 comes to rest too. During the stroke of the advancing piston-cylinder assembly 52 from FIG. 29 to FIG. 30, the intake port 140 has first opened and thus closed the port 152 and the passage 133, so that the fuel-air mixture passes from the area 151 into the cylinder 60 via the passage 134.

In the FIG. 30 position, the port 140 is completely closed, and the now-advancing piston-cylinder assembly 51 begins its ninety degree stroke, moving from the FIG. 30 position to the FIG. 31 position. Since this is a compression stroke, the intake area 151 is continuously closed, as are all other ports including the rotary port 133 which is advancing ninety degrees. All ports are sealed against compression loss by the circular rings 141 and 141a and the horizontal vanes 142, 142a and 145. During the compression stroke, the pressure in the passage 134 is equal to that in the cylinder 60, but gases cannot escape through the port 133 because of the circular rings 141a and the horizontal vanes 142a and 145.

In FIG. 31, the rotary port 133 has come to rest before crossing the horizontal vane 142a, compression loss being checked by the horizontal vanes 142a and the circular rings 141a. Since the outer sleeve 130 in FIG. 31 has traveled ninety degrees, as has the cylinder 60 to which it is affixed, both have reached the end of their stroke, and they come to rest. Again, since one and only one piston-cylinder assembly is in motion at any give time, the opposite cylinder 65 now begins its rotation the instant the cylinder 60 comes to rest, thereby rotating the intake sleeve 137 from the FIG. 31 position to the FIG. 32 position.

FIGS. 31 and 32 demonstrate that the intake rotary port 140 does not cross any other port during this ninety degrees of rotation, which is a power stroke. Ignition pressure within the cylinder 60 is still checked by the position of the rotary port 133, while the intake port 140 advances to the FIG. 32 position. Thus, during the compression and power strokes, the port 133 is continuously closed, either by the intake-exhaust exchanger 136 or by the intake sleeve 137. Once the cylinder 65 reaches its ninety degrees of travel, it is brought to a rest by means of the bell crank 72 and pivot arm 73 assembly, operating in conjunction with the thrown cam 71, which instantly places the opposite cylinder back into motion.

As the cylinder 60 advances from the FIG. 32 position to the FIG. 33 position, it moves with it the outer sleeve 130 and the rotary port 133, which cross the exhaust port 153, first opening and then closing this port 153. Exhaust gases cannot flow into the intake area 151, since the area 151 is checked by the intake sleeve 137, plus the circular rings 141 and horizontal vanes 142 incorporated with it. Therefore, the exhaust gases exit from the cylinder 60 via the intake-exhaust bore 134, the port 133, and the exhaust port 153, while the rotary port 133 is in motion. From the exhaust port 153 the exhaust gases flow into the slotted passage 154 and from there into the stationary circular exhaust bore 155 (FIGS. 1 to 4), the exhaust conduct 156 removing the exhaust gases from the engine.

It should be noted that FIG. 33 is identical to FIG. 29 except that it is inverted; all four strokes of one cylinder 60 have taken place from FIG. 29 to FIG. 33, and the intake stroke is ready to begin again. This sequence goes on continuously as long as the engine runs.

The capacity of the rotary ports, although restricted by rotation, is sufficient for the engine 50 to breathe adequately, partly due to their generally rectangular cylindrical-arc shape. The lengths of these ports can be adjusted so that the rotary ports function with the same amount of efficiency as conventional intake and exhaust valves. Compression loss is minimal, due to the horizontal vanes 142, 142a and 145 and the circular rings 141 and 141a, and to the lower compression of the engine itself, which is intended for a typical compression ratio of eight to one.

It should be stressed that the intake sleeve 137 does not directly engage the wall of the internal bore 150 of the intake-exhaust exchanger 136, and that the external bore of the intake-exhaust exchanger 136 does not directly engage the wall of the circular sleeve 132. Minimum clearance at these locations is provided for expansion; however, the only engagement between these components is achieved by the circular rings 141 and 141a and the horizontal vanes 142, 142a and 145, thereby reducing friction and temperature difficulties.

FIG. 34 shows one main bearing support housing 96 taken along the line 34—34 in FIG. 1. (The other housing 95 is similar.) FIGS. 1, 2, and 34 show that the housing 96, aside from providing main bearing support, also has the stationary bores 147 and 155, which serve, respectively, as the intake and exhaust passages. An intake manifold 160, bolted to the main bearing support housing 96 distributes and fuel-air mixture to the opposite sides of the engine 50 and into the main bearing support housings 95 and 96. When the main bearing support housings 95 and 96 are bolted against the crankcase 53, as in FIG. 35, a hollow chamber 161 is formed. This chamber 161 leads to an additional hollowed area 162, identified by broken lines in FIG. 34, and into the internal bore 147 which is the area that supplies the fuel-air mixture to the intake-exhaust exchanger 136, as shown in FIGS. 1-4. The fuel-air mixture is directed to both main bearing support housings 95 and 96 from a common carburetor (not shown), and the chamber 147 supplies the slotted passages 148 of the intake-exhaust exchanger 136 with the fuel supply.

FIG. 34 also shows that the larger bore 155 has a hollowed exit passage 163 leading from the circular bore 155 into a chamber 164, which is similar to the chamber 161 in construction. The chamber 164 empties into an exhaust manifold 165 that is connected to both main bearing support housings 95 and 96 and empties into the atmosphere. The chambers 155 and 147 are not in line and are at different depths, FIGS. 2-4, the difference in depth making it possible to hollow out the passages 162 and 163 into their respective internal bores 147 and 155 without interconnecting them.

Correction of position errors occurring during operation (FIGS. 4, 5, 20, 24, 25, 27, 28, 34, and 36-38)

It was earlier assumed, for the purpose of simplicity, that the intake-exhaust exchanger 136 remained stationary, so that once the engine sequence is set up, the intake and exhaust ports would remain in time with the cylinders. However, due to physical limitations of the clutching mechanisms which prohibit reverse rotation, small position errors accumulate so that the ports 133 and 140, which rotate with the piston-cylinder assemblies 51 and 52, get out of synchronization with the ports 152 and 153 of the intake-exhaust exchanger 136. Therefore, the invention provides a system for keeping the intake-exhaust exchanger 136 in synchronization with the cylinders 60 and 65.

Forward error cannot be developed; error can only be accumulated in a direction opposite to the direction of rotation of the piston-cylinder assemblies 51 and 52. If the clutching cogs 103, which operate within the stationary drum 76 (FIG. 2), were to accumulate a backward error of one-thousandth of an inch per revolution, it is apparent that by one thousand revolutions the ports 133 and 140 would be one inch out of azimuth synchronization with the ports 152 and 153 of the intake-exhaust exchanger 136. Such an error can develop with even the most minute amount of compounded slippage of the cogs 103 in the stationary drum 76, for although slippage is *nearly* non-existant, some slippage does occur and is compounded by every additional revolution.

Referring to FIG. 5, the set screws 116 in the bell crank 72 and the pivot arm 73, tighten against the pins 113 and 114 in the notched areas 117 of the swing pins (FIGS. 5 and 19). This secures the swing pins 113 and 114 into a fixed position within the bell crank 72 and pivot arm 73, respectively, and also prohibits the swing pins 113 and 114 from working free horizontally. The swing pins 113 and 114 are therefore fixed rigidly to the pivot arm 73 and the bell crank 72. As these two components move into different angular positions due to rotation of the thrown cam 71, it can be determined that these pins 113 and 114 will pivot with the same degree of angular movement.

FIGS. 36, 37, and 38 show the orbit and pivot movement of the swing pins 113 and 114 through ninety degrees of travel between successive figures. FIGS. 36, 37, and 38 also show how each swing pin 113, 114 engages a reset arm 166 which is secured to the intake-exhaust exchanger 136 as shown in FIGS. 4, 25, and 28.

The true revolving center of the shaft 55 is again identified by the cross 112 on the thrown cam 71, in FIGS. 36-38. The true center of the shaft 55 is also the true center of orbit of the swing pins 113 and 114 and the true center of rotation of the support shafts 80, 81, 85, and 86. The swing pin 113 moves counterclockwise ninety degrees from FIG. 36 and comes to rest in the FIG. 37 position, which indicates the limit of the cylinder stroke, governed by the roller 121. Since the opposite cylinder must now move counterclockwise, the swing pin 114 moves with it. As the swing pin 114 moves counterclockwise from the FIG. 37 position to the FIG. 38 position, the bell crank 72 and the pivot arm 73 are obtaining angular differences in relation to true center, as is the swing pin 113, due to the set screws 116 that lock into the swing pins 113 and 114. As the roller 121 moves downward from the FIG. 37 position to the FIG. 38 position, due to cylinder travel, the swing pin 113 also changes its angular relationship to true center, since it is secured to the bell crank 72, which has just changed its angular relationship to true center. As the swing pin 113 moves from the FIG. 36 position to the FIG. 37 position, a small cam 167, which can also be seen in FIG. 4, clears a reset arm 166 because of a notch below the cam 167 in the swing pin (see FIG. 19). This enables the swing pin 113 to pass the reset arm 166 without engaging it.

As the next ninety degree stroke begins, the swing pin 114 is moved from the FIG. 37 position to the FIG. 38 position, orbiting to below true center through ninety degrees of travel. As it does, the angular difference of the bell crank 72 on which the swing pin 113 is secured by the set screws 116 changes its angular position in relation to true center. This angular change causes the small cam 167 to engage with a bearing 168 on the reset arm 166, which is secured to the intake-exhaust exchanger 136. If the clutching cogs 103 (located within the stationary drum 76 on which the cylinder carrying the swing pin 113 is located) were to backslip a few thousandths of an inch, the small cam 167 located on the swing pin 113 would engage the roller 168 and reset the exchanger 136 to its correct position. Since engine rotation in FIGS. 36-38 is counterclockwise, any error accumulated by the swing pin 113 must be clockwise. Since the reset arm 166 is stationary, when this clockwise error engages the small cam 167 with the reset roller bearing 168, it resets the exchanger 136 to a new position and does so in a direction opposite to that of cylinder travel.

Thus, each time the swing pin 113 makes one complete orbit around true center, as indicated by the cross lines 112 on the thrown cam 71, it re-engages the cam 167 with the bearing 168 of the reset arm 166. If error has not accumulated, then the small cam 167 does not engage the bearing 168. If some error has accumulated, the reset arm 166 is moved in an opposite direction and in the precise amount of the accumulated error.

FIG. 27 shows that a ratchet spring 170 is secured to each main bushing 90 (or 91) which is pressed into the housing 93 (or 94), and which the inner bore of the intake-exhaust exchanger 136 rides upon. This inner bore is a slip fit which needs very little lubricant, due to its very slow movement. The intake-exhaust exchanger 136 moves only enough to compensate for error, but does not otherwise rotate. As noted, any movement or rotation of the intake-exhaust exchanger 136 is always in an opposite direction to that of its cylinder travel. In FIG. 27 the ratchet spring 170 has a pawl 171 which engages a ratchet 172 having teeth 173 which are cut 360° around and to the length X in FIG. 25, so that the remainder of the internal bore of the intake-exhaust exchanger 136 can support itself with a slip fit on the main bearing support sleeve 93 (or 94). The ratchet teeth 173 have an azimuth value of half the distance of the area between the ports 152, and 153, in FIGS. 24 and 25. This means that the maximum of accumulated error is only half of the distance between the ports 152 and 153. The ratchet teeth 173 prevent the rotating ports of the intake sleeve 137 and the outer sleeve 130 from getting out of synchronization by more than one-half the distance of the area between the ports 152 and 153, before locking into a new position. This prevents those ports from overlapping and getting out of synchronization enough to bleed across from one port to the other.

In FIG. 38, had the swing pin 113 been in error by an amount of one degree, the small cam 167 would have engaged the bearing 168, moving the reset arm 166, and with it, the exchanger 136 clockwise one degree. However, this would be insufficient to lock the spring 170 and its pawl 171 into a new position, since one degree is not the maximum allowable error to be accumulated before a new position can be obtained. Once the swing pin 113 begins to travel counterclockwise, the intake-exhaust exchanger 136 remains in its previously occupied position, or until the following revolution. Drag on the intake-exhaust exchanger 136, induced by the circular and horizontal vanes thereon, and the circular and horizontal vanes on the intake sleeve 137 exerts a constant force attempting to turn the intake-exhaust exchanger 136 in the direction of the cylinder travel. This force, due to friction, keeps the pawl 171 snugly engaged with the ratchet 172 at all times, until the small cam 167 moves the intake-exhaust exchanger 136 against the friction and into a new setting with the pawl 172 engaging different ratchet teeth 173.

To summarize, the ratchet teeth 173 allow only a predetermined amount of error to accumulate before resetting the intake-exhaust exchanger 136 to a new position, and that rotation of the intake-exhaust exchanger 136 is always in a direction opposite to that of the piston-cylinder travel. Furthermore, this rotation is very slight, due to the fact that their movement is only correctional.

FIGS. 2 and 3 show that the outermost rings 141a of the exchangers 136, mate within the internal bores of the main bearing support housings 95 and 96. The exchangers 136, however, do not mate with the housings 95 and 96, and minimum clearance is desired between the intake-exhaust exchanger 136 and the chambers 147 and 155. Therefore, the chambers 147 and 155 are isolated from the crank case 53 by the rings 141a, and these rings 141a allow the exchanger 136 to rotate very slowly in an opposite direction to that of cylinder travel, while sectioning off the internal bores 155 and 147 in FIGS. 2, 3 and 34, from within the crankcase 53.

Engine Timing and Ignition System

(FIGS. 1, 2 and 39–48)

In this invention, the ignition timing is advanced centrifugally, and current is provided for ignition by a conventional point breaking method. For example, a distributor arm may direct the ignition current to the apropriate cylinder by means of a conductor bar and arc rings.

FIGS. 1 and 2 show a centrifugal shoe 175 which advances the timing and is located within the flywheel 56 and secured to a hub 176 which is part of the flywheel 56. Spaced from the hub 176 and the shoe 175 is a points breaker cam 177, which is located freely on the shaft 55 by means of a slip fit. The shape of the points breaker cam 177 is shown in FIGS. 43–47. A points breaker arm 178 and a distributor arm 179 are mounted on an electrically non-conductive points-mounting plate 180 that is keyed to the outboard clutching spool 100 by means of a key 181. The mounting plate 180, faces an electrical distributing plate 182, is electrically non-conductive and may be pressed onto the stationary drum 76.

Radial pins 183 are pressed into the flywheel hub 176 and rotate with the flywheel 56 and the shaft 55, which rotate constantly. FIGS. 39 and 40 show the mounting of the pins 183, along with a tension spring 184. The bore in the advancement shoe 175 holding the pin 183 engages the flywheel hub 176 in a slip fit; the spring 184 engaging the flywheel hub 176 and the internal upper end of the shoe 175, works against the heavier side of the shoe 175 to keep it against the flywheel hub 176. When the flywheel 56 is rotated, as in the direction of the arrow, in FIG. 39, the heavier side of the shoe 175 tends to move outwardly, away from the hub 176, due to centrifugal force. This action compresses the spring 184, and the spring tension and the weight of the heavier side of the shoe 175 determines the amount of distance by which the heavier side of the shoe 175 will be displaced outwardly from the flywheel hub 176.

The points breaker cam 177 has a flange 185 and a secured pin 186 (FIGS. 41 and 42) and two high spots or lobes 188 and 189 (FIGS. 43–47). When the points breaker cam 177 is slid onto the shaft 55, the pin 186 is caused to engage a slot 187 in the advancement shoe 175, as seen in FIGS. 39 and 40. During slow rotation of the flywheel 56, the pin 186 maintains a constant position in relation to the center of the shaft 55. Whenever the speed of the shaft 55 and of the flywheel hub 176 increases, centrifugal force moves the heavier side of the advancement shoe 175 outwardly, as in FIG. 40, compressing the spring 184. The pin 186, which is part of the flange 185, is then lowered below center, and advances the ignition timing by rotating the points breaker cam 177 in the same direction of rotation as that of the advancement shoe 175. This advancement of the points breaker cam 177 is indicated in FIG. 40 by a dimension Y. If the rotation speed of the flywheel 56 were increased further, the spring 184 would be further compressed, due to the centrifugal force acting on the heavier side of the shoe 175, and the dimension Y in FIG. 40 would increase, since the slot 187 in which the pin 186 engages, would be lowered further yet below center. This method of timing advancement is governed solely by the predetermined effect of the spring 184 and the heavier side of the shoe 175. Although the pin 186 is not shown in FIG. 2, the relationship of the shoe 175, the pin 183, the flange 185 of the points breaker cam 177 and the points breaker cam 177 itself are shown in their respective positions.

It will be understood that the flywheel shaft 55 cannot get out of synchronization with the cylinder-piston assemblies 51 and 52, due to the thrown cam 71, since the thrown cam 71 is driven by the rollers 121 and 123, which are part of the bell crank 72 and pivot arm 73 assembly, and they are secured to the cylinders 60 and 65. The shaft 55 is therefore, always in time with the cylinders 60 and 65, and this timing must not be confused with the accumulated position error of the two intake-exhaust exchangers 136. Further, the shaft 55 is completely independent of all other moving parts. Also, the outboard clutching spool 100 to which the plate 180 is keyed by means of the key 181 (FIGS. 1 and 2), is never out of time with the cylinders 60 and 65, since it is keyed to the support shaft 86 which is rigidly secured to the cylinder 65.

The points mounting plate 180 is always in time with the cylinders 60 and 65, since it, too, is linked to the cylinder 65 by means of the key 181, the clutching spool 100, and the key 101 on the support shaft 86.

The mounting plate 180, therefore, rotates with the second cylinder 65, and when the cylinder 65 rotates ninety degrees, so does the mounting plate 180, half of the time, thus the plate 180 is in motion half of the time and is at rest half of the time. The direction arrow in FIG. 43 indicates the direction of rotation of the cylinders 60 and 65, the direction of rotation of the flywheel 56 and its shaft 55, and the direction of rotation of the points cam 177.

The non-conductive electrical deployment disk 182 is secured to the stationary drum 76, and three brass rings 191, 192 and 193 (FIG. 2) each form an unbroken circle at a constant radius around the center of the shaft 55. The ring 191 is linked directly to the electrical ignition output of a coil. The ring 192 is the electrical supply ring for a spark plug 194 of the first cylinder 60, and the ring 193 is the supply ring for the spark plug 194a of the second cylinder 65. Constant current is supplied to miniature brushes 195 and 196, which make physical contact with slip rings 197 and 198. The slip ring 197 is always connected to the points breaker arm 178 and a point 199 thereon; the slip ring 198 is always connected to a point 200, and the arm 178 makes and breaks the contact between the points 199 and 200. Pins 201, 202, and 203 extend all the way through the points mounting plate 180 in FIG. 2, from one face to the other, and they rotate in a circular pattern directly across from the rings 191, 192, and 193. is minimal, with only enough clearance to avoid physical contact. Ignition current from a coil can be transferred from the ring 191 to the pin 201 of the disk 180 by arcing across the narrow gap. From the pin 201, the ignition current passes through the distributor arm 179 to the pin 202 or to the pin 203, (see FIGS. 43-47), depending on the position of the distributor arm 179, which is determined by the points breaker cam 177.

As the pins 201, 202 and 203 rotate with the disk 180, they are always directly across and in line with the rings 191, 192, and 193, which are stationary with respect to a disk 182, as seen in FIG. 2, so that arcing can take place between these rings 191, 192, and 193 and the pins 201, 202, and 203 in any position through three hundred sixty degrees of rotation by the disk 180. Current to the points breaker arm 178 and the points 199 and 200 is supplied through three hundred sixty degrees of rotation by the miniature brushes 195 and 196, in contact with the slip rings 197 and 198, which are part of the mounting disk 180.

As seen in FIG. 2, ignition current induced into the pin 203 arcs the distance to the ring 193, which transfers the current to the spark plug 194a of the second cylinder 65. In FIG. 43 the point breaker arm 178 has just broken the electrical current across the points 199 and 200, supplied by the brushes 195 and 196 to the slip rings 197 and 198. Ignition current then flows from the coil to the circular ring 191 and arcs across to the pin 201 and is transferred to the pin 203 by means of the distributor arm 179.

Once ignition current is induced into the pin 203, it then arcs the small distance to the ring 193. From the ring 193, ignition current is then conducted by wire to a stationary ring 204, located on the right hand side of the engine 50, as viewed in FIG. 3. The current then arcs across a narrow gap to another ring 205 which is part of a non-conducting rotation spool 206. From here, the current is transferred to a spring 207 and a graphite tip 208, which makes physical contact with a conductor bar 210, located within the outer support shaft 85. This conductor bar 210 conducts the current to the spark plug 194a, located beneath a plug cover 211.

Proper grounding for the shaft 85 is supplied by a grounding ring 213, which is pressed into an electrically non-conductive housing cover 214. A small arc ring 215 is pressed onto the shaft 85 and runs with minimum clearance between it and the internal bore of the ring 213. Grounding current can arc to this ring 213 without damaging the shaft 85 and still provide adequate grounding to complete the circuit. The conductor bar 210 is shown in FIG. 48 and is located in the outer support shafts 85 and 81.

FIGS. 43-47 show the operation of the points cam and the distributor arm through one cycle of four strokes of engine rotation. In FIG. 43 the points mounting plate 180 is shown; it is omitted from FIGS. 44-47 to conserve space. In FIG. 43 the ignition points breaker arm 178, the spring tension of which is maintained by a pin 216, has just opened the points 199 and 200 from each other, due to rotation of the points breaker cam 177 which has engaged its high point 188 with the points breaker arm 178. With this breaker in current, ignition current flows from the coil to the ring 191, (FIG. 2), and to the pin 201, (FIG. 43) once again to the pin 203, and from there, to the cylinder 65.

Once the cylinder 65 has received ignition by means of the spark plug 194a, it advances ninety degrees. Since the plate 180 is keyed to the shaft 86 that supports the cylinder 65, it, too, rotates ninety degrees, moving from the FIG. 43 position to the FIG. 44 position.

As stated earlier, the thrown cam 71 of the shaft 55 moves at a two-and-a-half to one ratio, and this moves the points breaker cam 177 the same distance, since the amount of the points cam rotation is governed by the flywheel 56. In moving from the FIG. 43 position to the FIG. 44 position, the points breaker cam 177, therefore, travels two-and-a-half times as far as does the disk 180, which moves the points and distributor mechanism ninety degrees. Since the cylinder driving the mounting plate 180 and the points breaker cam 177 driven by the shaft 55 cannot get out of phase or timing with each other, both reach the FIG. 44 position at precisely the same time, although the points breaker cam 177 is rotating two-and-a-half times as fast. Since the ignition points and the distributor arm 179 move with the disk 180, nothing changes except the position of the high spots 188 and 189 of the cam 177.

Notice that a contact pad 218 on the distributor arm 179 is larger than a mating contact pad 219 on the ignition points breaker arm 178; thus the high point 188 makes contact with the pad 218 before the high point 189 makes contact with the pad 219 on the ignition points 178. Since this contact takes place before the points 199 and 200 can be opened, the distributor arm 179 is set into motion and energizing the pin 202 before the points 199 and 200 open, as seen in FIG. 44. Then the ignition points 199 and 200 open, breaking the current supplied by the miniature brushes 195 and 196 to the slip rings 197 and 198 of the disk 180. Ignition current then flows from the coil to the ring 191, is transferred from there by arcing to the pin 201, and from there the current is conducted to the pin 202 by the distributor arm 179. The current then arcs the distance from the pin 202 to the ring 192, and is transferred to the spark plug 194 for the first cylinder 60 in precisely the same way as described earlier for the spark plug 194a of the cylinder 65.

FIG. 45 shows the distributor arm 179 and the ignition points breaker arm 178 maintaining the same position as in FIG. 44, because the second cylinder 65 is at rest between them, as is the points mounting disk 180, while the first cylinder 60 moves through ninety degrees of travel, and the points breaker cam 177 and the flywheel shaft 55 are moved clockwise two hundred twenty-five degrees, because the first cylinder 60 moves ninety degrees between FIGS. 44 and 45. In FIG. 45, the high spot 188 is engaging the ignition points breaker arm 178, and there is no support under the distributor arm 179, allowing it to make physical contact with the pin 203. This again provides ignition to the second cylinder 65, although the cylinder 65 at this time is finishing its exhaust stroke. Thus, FIG. 43 was the beginning of the power stroke for the cylinder 65; FIG. 44 was the end of the power stroke for the cylinder 65 and the beginning of the power stroke for the cylinder 60; and FIG. 45 is the end of the exhaust stroke for the second cylinder 65.

As shown in FIG. 46, the mounting disk 180 has once again moved ninety degrees from its FIG. 45 position, moving with it the distributor arm 179, the associated pins 201, 202 and 203 and the ignition points breaker arm 178. As a result, two hundred twenty-five degrees of rotation has been accomplished by the flywheel 56 secured to the shaft 55, thereby rotating the points breaker cam 177 two hundred twenty-five degrees. Again it should be stressed that the shaft 55, the flywheel 56 and the points cam 177 cannot get out of timing with respect to the cylinders 60 and 65 and, although revolving two-and-a-half times as fast, reach the FIG. 46 position at the precise time that the support disk 180 reaches the FIG. 46 position.

As before, the high point 188 mates with the contact pad 218 of the distributor arm 179 a few degrees before the high point 189 mates with the contact pad 219 of the ignition points arm 178, thereby establishing physical contact between the distributor arm 179 and the pin 202 just in advance of ignition, or just before the ignition points 199 and 200 break the current, as seen in FIG. 46. Ignition current from the coil is transferred once again to the pin 202 from the pin 201 by means of the distributor arm 179, arcs the distance to the ring 192, and is transferred to the spark plug 194 in the first cylinder 60.

In the FIG. 46 position, the first cylinder 60 is just completing its exhaust stroke, since FIG. 44 was the beginning of its power stroke. It can be understood that each spark plug 194, 194a will fire every time the closed end of a cylinder and piston reach their closest proximity, or in advance of their closest proximity, as regulated by the advancement shoe 175.

FIG. 47 is exactly the same as FIG. 43, except that it is inverted with respect to FIG. 43. This begins the cycle over again, with ignition current being diverted to the pin 203 from the pin 201 by the distributor arm 179. The points breaker arm 178 has just broken the current to the points, and ignition current from the coil is again transferred to the spark plug 194a of the second cylinder 65, which is now beginning its power stroke. This sequence goes on as long as the engine turns.

Thus, one ignition points breaker arm 178 and one set of points 199 and 200 regulate ignition current for both cylinders 60 and 65, and this current is transferred to the appropriate cylinders 60 or 65 by the regulating distributor are 179. Both are operated by the points breaker cam 177, which is set into motion by the flywheel 56 by means of the hub 176 secured to the shaft 55.

Lubrication of the Engine

(FIGS. 1-5)

An oil seal 220 (FIGS. 2 and 3) is pressed into the boundary of each housing cover 214 to prevent oil from the stationary drum 76 from entering the electrical transfer area and to prevent oil from within the casing 58 from entering the corresponding opposite area. FIGS. 2 and 3 show that the main bearing support housings 95 and 96 incorporate an oil seal 221 to prevent oil from entering the electrical transfer area from within the crankcase 53, so that all the area within the housings 214 are completely isolated from the lubricating oil. Another oil seal 222 is pressed into the stationary drum 76 at its boundary, and one ore oil seal 223 is pressed into an internal bore of the clutching spool 100 (which is the left outboard clutching spool, while viewing the engine in FIGS. 1 and 2) to prevent lubricant from exiting the engine 50 at this point. The support housing 58 for the power take-off shaft 54 carries the bushing 124, as does housing 76, and has an oil seal 224 at its boundary to prevent oil from exiting the engine at this pooint.

Also, a snap ring seal 225 is located on each half of the engine between the sleeve 93 or 94 and the intake-exhaust exchanger 136. As mentioned earlier, the intake-exhaust exchanger 136 moves at a very slow rate, and therefore needs very little lubricant. The snap ring 225 prevents oil from being worked between the main bearing support sleeves 93, 94 and the intake-exhaust exchanger 136 and into the chamber 147, so that oil does not pass beyond this point. A ring 226, a similar type of seal, prevents oil from being worked into the chamber 151 (FIG. 4), thus isolating the chamber 151 from the crankcase 53.

Lubricating oil to the engine 50 may be supplied by an oil pump indicated by a conventional symbol located in an area 230 designated for this purpose. The oil pump supplies cooling oil 231, indicated by "X"ed marks in FIGS. 2-4 between the main bearings 90 and 91. This cooling oil is exchanged at a fast rate to carry away heat from the main bearings 90 and 91 and from the support sleeves 93 and 94, which are in fairly close proximity to the exhaust bore 154. This oil 231 provides a lubricant for the shafts 81 and 85 and also cools the main bearings 90 and 91, and the housing sleeves 93 and 94.

All oil directed to the area of the oil 231 is constantly recycled and returned to a reservoir 232. The oil pump also supplies the stationary drum 76 and the power take-off drum 75 with lubricant for the cogs 103 and the internal bores of these drums. Moreover, an oil level (not shown) is maintained inside the stationary drum 76 and the power take-off support housing 58 at a level nearly to the center of the cog pins 102, located below the centerline of the engine. This supplies an oil bath for the cogs 103 and a constantly changing cooling oil to dissipate heat; while simultaneously providing adequate lubrication. This oil level is maintained and constantly recycled back to the reservoir 232, in FIGS. 1-3, and 5.

Lubricant to the two tiers of concentric shafts 54, 80, 85 and 55, 81, 86 is supplied by oil grooves on the external surfaces of the shafts, and these grooves divert oil picked up by the clutching disks the full lengths of the shafts, thereby properly lubricating the internal shafts which are not receiving oil from the area of the oil 231.

Some oil from the area of the oil 231 is directed inwardly past the two inwardmost bearings 90 and 91, in FIGS. 1 and 4, and toward the perpendicular center line of the engine 50. A small groove (not shown) in the inward main bearings 90 and 91 enables this oil to move horizontally and toward the perpendicular center line of the engine, as seen in FIGS. 1 and 4. By passing through these grooves, oil is cast upon the bell crank 72, the pivot arm 73, the thrown cam 71, and all the mechanisms located in the adjacent area, supplying adequate lubrication for these components. Oil is also cast off these components due to the components movement while working and partly because of centrifugal force. This oil, cast outwardly, lubricates the pistons 62, 67 and the cylinders 60, 65. Oil is then collected in the reservoir 232, to be cooled and used again. An oil splash screen 233 in FIGS. 1-3, and 5 keeps engine vibration from over-lubricating the cylinders 60 and 65 and restricts the oil to within the reservoir 232 where it is cooled and held to be redistributed again.

Cooling the Engine
(FIGS. 1-5)

It can be seen in FIGS. 1 through 5 that the engine 50 is an air-cooled engine. There are exterior cooling fins 235 on the engine crankcase 53 and interior cooling fins 236 on the appropriate cylinders 60 and 65.

Air is drawn into the engine crankcase 53 from the outside atmosphere, by way of an air cleaner 237 (FIGS. 1 and 3) and through a passage 238, which enters the interior of the crankcase 53. The air is then moved downward and across the cylinders 60 and 65 to a passage 239 (FIGS. 1 and 2), which exits from the crankcase 53. This movement of air is induced by blower vanes 247 on the flywheel 56. Air is drawn from the passage 239 through a filtering medium 240, located in a chamber 241 of a secondary air shroud 242.

As the air moves upward through the filtering medium 240, oil droplets are removed and returned by gravitation to the oil reservoir 232. From the filtering medium 240, the air flows via a passage 243 inside the secondary air shroud 242 into a chamber 244, which is also inside the secondary air shroud 242. From the chamber 244, the air flows into a chamber 245, which is an internal bore of the flywheel 56. Then the air is drawn into revolving passages 246 in the flywheel 56 and into the interior of the primary air shroud 57.

The air has been moved thus far by the creation of a low pressure area caused by rotation of the flywheel 56, but once beyond the revolving passages 246, the air is then moved by a high pressure caused by vanes 247 on the flywheel 56. It flows first into a chamber 248, which is the interior of the primary air shroud 57, and then the cooling air is moved downward into the lower section of the air shroud 57 in an area which is still part of the chamber 248, and thence into a heat exchanger portion 250 of the reservoir 232 by passages 249. The forced air is then moved along or through corridorsl or throughs 251 in casing portion 252 as best seen in FIG. 5, but shown also in FIGS. 1 and 2. The heat exchanger portion 250 of the reservoir 232 causes a greater surface area to come into contact with the cooling air as the air moves along the corridors 251 and toward an outlet 253 whence it flows back into the atmosphere.

Cooling air movement of the engine 50 continues constantly, even at engine idle, with cool air being drawn through the system from the passage 238 to the passage 239. Beneficially, since the cylinders 60 and 65 are rotating, the cooling fins 236 located on the cylinders 60 and 65 transfer cylinder heat quickly to the air that is being moved by the flywheel 56. This cools the interior of the engine 50, including the pistons 62 and 67, and all moving parts not normally air cooled in conventional engines, since only the exterior of most air cooled engines can transfer heat to the atmosphere.

In FIGS. 1 and 5, the external cooling fins 235 cool the engine crankcase 53 when forward motion of the engine 50 is induced or when an external fan (not shown) is forcing air across the engine 50. FIG. 5 shows that the oil cooling is achieved much like water cooling in an automobile radiator, with cool air being forced through independent chambers which are on the opposite side of the liquid.

Once leaving the outlet 253, the air, if desired, may be recycled continuously back to the air cleaner 237, thereby creating a closed system which would prevent crankcase pollutions from entering the atmosphere. In such a closed system, the air would preferably have to be cooled further to increase its density, if the carburetor were to draw its supply of atmosphere from this closed system. If this is done, fresh air would only enter the system by means of a regulating damper and only when the carburetor has removed a given amount of atmosphere from the system. All crankcase fumes would then be directed to the carburetor and burned during combustion.

The engine may be cooled from the interior as well as the exterior without harmful pollutions being placed in the atmosphere, if the closed system is incorporated; when the density of the atmosphere is low, adequate cooling of the engine will be achieved.

Operation
(FIGS. 1-5)

The operation of the engine through one hundred eighty degrees of cylinder travel is as follows:

Motion is induced by means of a starter or by a starter cord pulley 255 in FIGS. 1 and 2. This induced motion turns the flywheel 56 and its shaft 55. It also sets into motion the flywheel hub 176, which, in turn, revolves the pressed-in pins 183 which set into motion the advancement shoe 175, and this turns with it the points breaker cam 177. Also turning with the shaft 55 is the thrown cam 71, which is supported on the right side of perpendicular center, in FIGS. 1 and 4 by the small secondary shaft 110 which rotates inside the bushing 111. Since motion was induced to the thrown cam 71, its low side or bottom dead center is engaged with the roller 123, (FIG. 5). Since the area between true center and the roller 123 must increase as the thrown cam 71 revolves, it can be seen that the swing pin 113 orbits counterclockwise, since rotation is counterclockwise in FIG. 5.

By orbiting the pin 113, the first cylinder 60 and the piston 62 move counterclockwise; the swing pin 113 is orbited ninety degrees, since the swing pin 113 is linked directly to the first cylinder 60 as well as to the flange of the appropriate support shafts, as shown in FIGS. 1 and 4. As the pin 113 moves counterclockwise, (FIG. 5) the shaft 80 is moved counterclockwise, when viewing rotation along the line 5—5 in FIG. 1. Rotation of the shaft 80 moves the clutching spool 97 which is keyed to the shaft 80 (FIG. 3). As the thrown cam 71 engages the roller 123, attempting to orbit the swing pin 113 counterclockwise, the resultant will be just the opposite on the swing pin 114, tending to orbit the swing pin 114 clockwise. The swing pin 114 is secured to the shaft 86, which is keyed to the left outboard clutching spool 100. However, the clutching cogs 103 in this particular clutching spool 100 prevents the swing pin 114 from rotating clockwise. Therefore, all movement induced by the thrown cam 71 is accomplished by the swing pin 113, which drives the right outboard clutching spool 97, as seen in FIG. 3. The cogs 103, in this particular arrangement, engage the drum 75 which is part of the shaft 54, thereby driving the take-off shaft 54.

Induced power supplied by the starter continues to rotate the cylinders 60 and 65 until ignition. In FIG. 5, if ignition had just occured between the second cylinder 65 and the piston 62, then the piston 62 would be set into motion along with the first cylinder 60. It is the first cylinder 60 which is trying to orbit the swing pin 113 around true center. The second cylinder 65, where ignition occured, cannot move clockwise, due to the clutching cogs 103 in the stationary drum 76; therefore, the swing pin 114 cannot orbit clockwise.

As the first cylinder 60 advances, pressure is applied by the roller 121 on the top of the thrown cam 71, thus rotating the cam 71 and with it the shaft 55 and the flywheel 56. The flywheel 56 drives the cylinders 60 and 65 by the same means and principles by which the cylinders drive the flywheel. The primary difference is that when the flywheel 56 is driving the cylinders 60 and 65, kinetic energy is being delivered from the flywheel 56 to the bell crank 72 and the pivot arm 73 from the low side to the high side of the thrown cam 71. When the cylinders 60 and 65 are driving the flywheel 56, movement is induced to the cam 71 from the high side to the low side of the cam 71. Any backward movement of a piston-cylinder assembly is checked by the clutching spools 98 and 100 in the stationary drum 76. All forward movement is delivered to the clutching spools 97 and 99 operating inside the drum 75, which is part of the power take-off shaft 54, thereby driving the shaft 54.

The purpose of the swing pins 113 and 114 must not be misunderstood. The swing pins do not drive the power take-off shaft 54; they transmit drive to the flywheel 56 whenever the cylinders are delivering power. They transmit drive from the flywheel to the cylinders during non-power strokes, misfire, or throttle down, or when the load is off the engine, because of the speed of the load exceeding the clutching capacity of the power take-off drum 75. Power is delivered to the power take-off shaft 54 by the cylinder support shafts 80 and 85, which are secured rigidly to the cylinders 60 and 65, respectively, by the bolt-up of mating flanges; and the swing pins have nothing to do with this power drive. Pressure on the swing pins can only be measured by the amount of kinetic energy stored in the flywheel 56 at a given time, or measured by the amount of resistance necessary to rotate the flywheel 56 whenever the cylinders are setting it into motion. It is impossible to place a greater load on the swing pins than the sum of kinetic energy stored in the flywheel or required to overcome the resistance of placing the flywheel in motion.

FIGS. 5 and 9 shows that the compression rings 105 of each cylinder are located in the cylinder wall instead of on the piston. It is the internal bores of the rings 105 that mate with the pistons 62 and 67 by collapsing tension of the rings instead of expansion, as associated with conventional piston rings. These rings 105 mate with steel sleeves 256 of the pistons 62 and 67 in FIG. 5, and this arrangement is desired primarily for weight reduction purposes.

Since both pistons and cylinders rotate in this engine, weight is of primary concern. The thin steel sleeves 256, encase the pistons to provide a wearing surface to mate with the compression rings 105. The purpose of having the steel sleeve 256 on the piston instead of within the cylinder wall is for weight reduction and heat expansion. Since only a thin steel sleeve is desired for weight reduction, it is necessary to have this sleeve on the exterior of the aluminum pistons. Since aluminum expands more and at a faster rate than steel, the sleeve 256 of either piston will become more tightly secured to the piston during expansion. Vice versa would be true if the sleeve were in the cylinder wall, necessitating a heavier sleeve, four or five times as heavy as the sleeves 256.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A two-cylinder rotary piston internal combustion engine, including in combination:

two interengaging arcuate piston-cylinder assemblies for circular movement on an engine plane, the piston of one assembly and the cylinder of the other assembly reciprocating with respect to each other, a rotary power take-off shaft on one side of and perpendicular to said plane, a rotary flywheel shaft coaxial with said power take-off shaft and perpendicular to and on the other side of said plane therefrom, with a flywheel mounted thereon, two separate rotary, at least partly hollow, support shafts for each said piston-cylinder assembly, one on each side of said plane and perpendicular to said plane, each rigidly attached to its piston-cylinder assembly, two said support shafts and the power take-off shaft being concentric, the three said shafts being rotatable relative to each other and supporting each other, two other said support shafts and the flywheel shaft being concentric, these three said shafts being rotatable relative to each other and supporting each other, a stationary engine casing surrounding said piston-cylinder assemblies and all said support shafts, said flywheel shaft and said power take-off shaft extending out therefrom, first clutching means on the power take-off side of said plane for clutching, in alternation, each of the two said support shafts on that side of the plane to said power take-off shaft, only one said support shaft at a time being clutched to said power take-off shaft, for enabling rotation of said power take-off shaft in a single direction only, and for enabling rotation of each piston-cylinder assembly in a single direction, only, so that during operation each said assembly alternates with the other said assembly in rotating during one stroke and remaining stationary during the next stroke, similar second clutching means on the flywheel side of said plane for clutching, in alternation, each of the two said support shafts on that side of the plane to said stationary casing and for preventing reverse rotation of those support shafts and the cylinders, and transmitting means for imparting drive from said piston-cylinder assemblies to said flywheel shaft and vice versa, in alternation.

2. The engine of claim 1 having means for operating each said assembly in a four-stroke cycle.

3. The engine of claim 2, wherein the piston of one assembly moves into the cylinder of the opposite assembly, while the cylinder of said one assembly moves away from the piston of said opposite assembly during a rotation of ninety degrees by said first assembly, while said opposite assembly is stationary, this happening during the compression stroke and also during the exhaust stroke for the piston of said first assembly and the cylinder of the said second assembly, and during the induction stroke and also during the power stroke for the cylinder of said first assembly and the piston of the second assembly, and then said first assembly remains stationary while the cylinder of said second assembly moves away from the piston of said first assembly and the piston of said second assembly moves into the cylinder of said first assembly, and so on during a series of four-stroke cycles.

4. The engine of either claim 1 or claim 3 wherein each piston-cylinder assembly comprises a cylinder having an open end and a closed head end and a hollow piston having a closed end and an open end which is closed against the head end of said cylinder, and means securing the cylinder and piston together.

5. The engine of claim 1 wherein each of said first and second clutching means includes
a drum,
a pair of clutching spools in said drum each keyed to a different said support shaft, and
locking means for alternately locking one spool to said drum while releasing the other spool therefrom and vice versa.

6. The engine of claim 5 having a replaceable wear sleeve in at least said drum in engagement with said spools.

7. The engine of claim 5 wherein each of said clutching spools comprises
an internal hub,
a circular series of pins in each spool,
a series of generally cylindrical clutching cogs, each mounted rotatably and offset on a said pin, each cog having a flat surface extending chordally and an off-center pin-receiving opening, and
a spring bearing at one end on said hub and at the other end on said flat surface, thereby locking said spool to said drum in one direction of rotation only of said spool and its support shaft.

8. The engine of claim 5 wherein, in said first clutching means the drum is an integral portion of said power take-off shaft.

9. The engine of claim 5 wherein, in said second clutching means the drum is rigidly secured to said stationary engine casing.

10. The engine of claim 1 wherein said transmitting means drives said flywheel and said flywheel shaft at a speed bearing a ratio of 2½ to 1 to the speed of said assemblies and said support shafts.

11. The engine of claim 1 wherein said transmitting means comprises:

a thrown cam offset on said flywheel shaft and having a circular surface,
an arcuate bell crank,
an arcuate pivot arm,
a first swing pin rigidly secured to said bell crank and pivotally secured to a first said piston-cylinder assembly and to an exterior bracket thereof,
a second swing pin rigidly secured to said pivot arm and pivotally secured to a second said piston-cylinder assembly and to an exterior bracket thereof,
a first roller rotatably secured to each of said bell crank and said pivot arm, which extend on opposite sides thereof for relative pivoting action, and
a second roller rotatably secured to said bell crank,
said first and second rollers having their outer surfaces in rolling engagement with said circular surface of said thrown cam.

12. The engine of claim 11 wherein said thrown cam revolves two hundred and twenty-five degrees for each ninety degree travel of each said swing pin.

13. The engine of claim 11 wherein said thrown cam and the members it acts upon operate through the center of mass.

14. The engine of claim 1 or 11 wherein:
each cylinder has a main bore in which said piston relatively reciprocates and an intake-exhaust passage leading through a wall of said cylinder connecting said main bore to a peripheral opening,
a hollow cylindrical intake-exhaust exchanger supported snugly but freely rotatably by said stationary engine casing and having a radially inner cylindrical bore and a radially outer plurality of lengthwise-extending passages separated by a cylindrical wall from said inner bore and from each other by partitions, said exchanger also having an input passage for connecting said inner bore with said peripheral opening during an intake stroke for said cylinder, said exchanger further having an exhaust passage for connecting said peripheral opening with at least one of said lengthwise passages during the exhaust stroke for said cylinder,
said casing having an exhaust chamber with an exhaust conduit leading therefrom and connected to said lengthwise passages and having an intake chamber connected to a fuel-air inlet conduit, and
a generally cylindrical intake sleeve rotatable in said inner bore of said exchanger and open to said intake chamber and having a closed end keyed to a said support shaft of the other said cylinder, for intermittant rotation therewith, so that each intake sleeve rotates relatively to its cylinder when that cylinder is stationary and that cylinder rotates relatively to that sleeve when that sleeve is stationary, said intake sleeve having an intake port through its cylindrical wall in alignment with said input passage during the intake stroke of its cylinder and otherwise closed off therefrom.

15. The engine of claim 14 wherein the intake-exhaust passage is round and said cylinder has a cylindrical porting sleeve secured rigidly to it and having a generally rectangular cylindrical-arc port providing said peripheral opening and a transitional shape leading to the round intake-exhaust passage, said exchanger's input passage and exhaust passage likewise having generally rectangular cylindrical-arc shapes of the same size as said port and is axial aligned therewith, and said intake port of said intake sleeve being similarly shaped and aligned.

16. The engine of claim 15 wherein said intake sleeve and said exchanger both have symmetrically located sealing rings and sealing linear vanes around their outer cylindrical surfaces, preventing leakages around their ports and passages.

17. The engine of claim 14 when depending from claim 11, having an error correction system to maintain alignment of each said exchanger with said cylinders within a predetermined amount, comprising:
   a correcting cam on one end of each said swing pin,
   a ratchet pawl on said casing,
   a reset arm on said intake-exhaust exchanger for occasional engagement with said correcting cam, and
   an internal ratchet on said exchanger engaging said ratchet pawl,
   said correcting cam moving said reset arm to correct any position error greater than the distance between said ratchet teeth.

18. The engine of claim 1 having
   a points breaker cam mounted on and for rotation with said flywheel shaft, said cam having two high spots,
   a non-conductive mounting plate encircling said flywheel shaft and secured to one said support shaft for rotation therewith around and relative to said flywheel shaft and supporting a conductive breaker points arm having a first contact point, a conductive distributor arm, a first conductive pin always in contact with said distributor arm, a second conductive pin with which said distributor arm is normally in contact, a third conductive pin spaced therefrom and normally out of contact with said distributor arm, a second conductive contact point normally in contact with said first contact point, and a pair of concentric slip rings, one electrically connected to each of said contact points,
   said high points engaging each said arm at different times to break contact momentarily between said first and second contact point and to cause said distributor arm to break contact momentarily with said second pin and make contact with said third pin,
   a stationary non-conductive electrical distributing plate facing said mounting plate,
   first, second, and third conductive rings supported concentrically by said distributing plate, spaced apart from each other and opposite said first, second, and third pins across a narrow air gap enabling arcing thereacross, said first ring being linked directly to the electrical ignition output of a coil,
   a first spark plug connected to said second ring for ignition in one said cylinder,
   a second spark plug connected to said third ring for ignition in the other said cylinder, and
   two conductive brushes supported by said distributing plate and in contact with said slip rings for supplying constant electrical current thereto at all times,
   said transmitting means including means for rotating said flywheel shaft at 2½ times the rotational speed of said support shafts during their rotation.

19. The engine of claim 18 having
   an asymmetric centrifugal shoe mounted on and for rotation with said flywheel shaft near to but spaced from said points breaker cam, centrifugal force tending to move said shoe radially outwardly relative to said shaft, said shoe having a radial slot therein,
   a tension spring between said shoe and said shaft for limiting and controlling radially natural movement of said shoe, and
   a pin extending in an axial direction from said points breaker cam into said slot,
   whereby changes in ignition timing are automatically made as the speed of the flywheel shaft increases and decreases, by movement of said pin in said slot.

20. The engine of claim 1 wherein said casing has a cool-air receiving opening on the opposite side of said engine plane from said flywheel,
   an air cleaner at said opening,
   first air-movement means on said flywheel for moving air across said cylinders toward said flywheel,
   an oil reservoir in said casing below said engine;
   a heat exchanger at the lower end of said oil reservoir, and
   second air movement means on said flywheel for impelling air from there through said heat exchanger and then out from said casing on the opposite side of said engine plane from said flywheel.

21. The engine of claim 20 having filter means in said casing for filtering said air immediately after its passage across said cylinders and for removing lubricating oil therefrom and returning it to said oil reservoir.

22. The engine of claim 20 wherein said cylinders and said engine casing both have heat-dissipating fins for cooling the engine casing by external air and also for cooling cylinders by the passage of incoming air around them.

23. The engine of claim 1 having compression ignition means.

24. A two cylinder rotary piston internal combustion engine, including in combination:
   two interengaging piston-cylinder assemblies, both cylinders and pistons being arcuate in shape for movement around a circle on an engine plane, the piston of each assembly and the cylinder of the other assembly reciprocating with respect to each other,
   a rotary power take-off shaft on one side of and perpendicular to said plane,
   a rotary flywheel shaft coaxial with said power take-off shaft and perpendicular to and on the other side of said plane therefrom,
   a flywheel mounted on said flywheel shaft,
   two separate rotary, at least partly hollow, cylinder support shafts for each said piston-cylinder assembly, one on each side of said plane, and perpendicular to said plane, each rigidly attached to its piston-cylinder assembly,
   the two said cylinder support shafts on the take-off side of said plane being concentric with said take-off shaft and surrounding it, the support shaft for one said piston-cylinder assembly being larger than and surrounding that for the other, the three said shafts being rotatable relative to each other and supporting each other, but not connected to each other,
   the two said cylinder support shafts on the flywheel side of said plane being concentric with said flywheel shaft and surrounding it, with the shaft for one said piston-cylinder assembly surrounding that of the other, these three said shafts being rotatable relative to each other and supporting each other, but not connected to each other, a stationary engine casing surrounding said piston-cylinder assemblies and all said support shafts, and having bearings supporting the outer said shafts for rotation, with said flywheel shaft and said power take-off shaft extending out therefrom, a first clutching system on the power take-off side of said plane having means for clutching, in alternation, each of the two support shafts on that side of the plane to said power take-off shaft, only one said support shaft at a time being clutched to said power take-off shaft, and for enabling rotation of said power take-off shaft in a single direction and also for enabling rotation of each piston-cylinder assembly in a single direction, a second clutching system on the flywheel side of said plane, having means for clutching, in alternation, each of the two said support shafts on that side of the plane to said stationary casing and for preventing reverse rotation of those support shafts, and the cylinders, and transmitting means for imparting drive from said piston-cylinder assemblies to said flywheel shaft and vice versa, in alternation, whereby at any time two different strokes are taking place simultaneously, each involving the piston of one said assembly and the cylinder of the other, each said piston-cylinder assembly moving alternately with the other.

25. The engine of claim 24 having means for operating in an Otto four-stroke cycle.

26. The engine of claim 24 having means for operating according to a diesel four-stroke cycle.

27. The engine of claim 24 wherein each piston-cylinder assembly comprises an arcuate cylinder having an open end and a closed head end and a hollow arcuate piston having a closed end and an open end which is closed against the head end of said cylinder, and a tapered pin engaging transverse openings through said head end and through said piston securing the cylinder and piston together.

28. The engine of claim 24 wherein each said cylinder-piston assembly has a pair of flanges and each said support shaft for that assembly has a flange, and means for securing the flange of each said support shaft to a flange of the said cylinder of said assembly.

29. The engine of claim 24 wherein each said clutching system comprises:
 a drum,
 a pair of clutching spools in said drum, each said spool being keyed to one said support shaft and having an internal hub and comprising:
 a circular series of pins mounted in each said spool,
 a series of clutching cogs, each mounted rotatably but offset on a said pin, each cog being cylindrical and having therewithin a flat chordal surface and serving as an inclined plane, and
 spring means bearing at one end on said hub and at the other end on said flat surface for locking said cogs to said drum in one direction of rotation of said spool and for releasing all the cogs from said drum for relative rotation when the spool is rotated in the opposite direction.

30. The engine of claim 29 wherein the drum for said first clutching system is an integral part of said take-off shaft.

31. The engine of claim 29 wherein the drum for said second clutching system is rigidly secured to said stationary engine casing.

32. The engine of claim 29 wherein said transmitting means comprises:
 a thrown cam on said flywheel shaft, said cam having a circular surface,
 an arcuate bell crank,
 an arcuate pivot arm,
 a first swing pin rigidly secured to said bell crank and pivotally secured to a first said piston-cylinder assembly and to an exterior bracket thereof,
 a second swing pin rigidly secured to said pivot arm and pivotally secured to a second said piston-cylinder assembly and to an exterior bracket thereof,
 a first roller rotatably secured to each of said bell crank and said pivot arm, which extend on opposite sides thereof for relative pivoting action, and
 a second roller rotatably secured to said bell crank, said first and second rollers having their outer surfaces in rolling engagement with said circular surface of said thrown cam.

33. The engine of claim 32 wherein said thrown cam revolves two hundred and twenty-five degrees for each ninety degree travel of each swing pin, so that said flywheel shaft rotates at 2½ times the rotational speed of said support shafts, when they rotate.

34. The engine of claim 32 wherein:
 each cylinder has a main bore in which said piston relatively reciprocates and an intake-exhaust passage leading through a wall of said cylinder connecting said main bore to a peripheral opening,
 a hollow cylindrical intake-exhaust exchanger supported snugly but freely rotatably on a cylindrical portion of said stationary engine casing, so that it can rotate but does not ordinarily do so, and having a radially inner cylindrical bore and a radially outer plurality of lengthwise-extending passages separated by a cylindrical wall from said inner bore and from each other by partitions, said exchanger also having an input passage separated by partitions from said lengthwise-extending passages and extending through to axial extending openings connecting with said inner bore and communicating with said peripheral opening at the rotational portion thereof during an intake stroke for said cylinder, said exchanger further having an exhaust passage for connecting said peripheral opening with at least one of said lengthwise passages during the exhaust stroke for said cylinder,
 said casing having an exhaust chamber with an exhaust conduit leading therefrom and connected to said lengthwise passages and having an intake chamber connected to a fuel-air inlet conduit, and
 a generally cylindrical intake sleeve rotatable in said inner bore of said exchanger and open to said intake chamber and having a closed end closing one end of said inner bore and keyed to a said cylinder support shaft of the other said cylinder, for intermittant rotation therewith, so that each intake sleeve rotates relatively to its cylinder when that cylinder is stationary and that cylinder rotates relatively to that sleeve when that sleeve is stationary, said intake sleeve having an intake port through its cylindrical wall in alignment with said input passage during the intake stroke of its cylinder and otherwise closed off therefrom.

35. The engine of claim 34 wherein the intake-exhaust passage is round and said cylinder has a cylindrical porting sleeve secured rigidly to it and having a generally rectangular cylindrical-arc port providing said peripheral opening and a transitional shape leading to the round intake-exhaust passage, said exchanger's input passage and exhaust passage likewise having generally rectangular cylindrical-arc shapes of the same size as said port and axially aligned therewith, and said intake port of said intake sleeve being similarly shaped and aligned.

36. The engine of claim 35 wherein said intake sleeve and said exchanger both have symmetrically located sealing rings and linear sealing vanes around their outer cylindrical surfaces, preventing leakages around their ports and passages.

37. The engine of claim 34 having an error correction system for maintaining port alignment of said exchanger relative to said cylinders within a predetermined amount, comprising:
  a correcting cam on one end of each said swing pin,
  a ratchet pawl on said casing,
  a reset arm on said intake-exhaust exchanger for occasional engagement with said correcting cam, and
  an internal ratchet on said exchanger engaging said ratchet pawl,
  said correcting cam moving said reset arm to correct any position error greater than the distance between said ratchet teeth.

38. The engine of claim 24 having
  a points breaker cam mounted slidably on said flywheel shaft and having an axially extending pin thereon,
  an asymmetric centrifugal shoe secured to said flywheel shaft near to but spaced from said points breaker cam, centrifugal force tending to move said shoe radially outwardly relative to said shaft, said shoe having a radial slot therein into which said pin extends,
  a tension spring between said shoe and said shaft for limiting and controlling radially natural movement of said shoe,
  a non-conductive mounting plate encircling said flywheel shaft and secured to one said support shaft for rotation therewith relative to said flywheel shaft and supporting a conductive breaker points arm having a first contact point, a conductive distributor arm, a first conductive pin always in contact with said distributor arm, a second conductive pin with which said distributor arm is normally in contact, a third conductive pin spaced therefrom and normally out of contact with said distributor arm, a second conductive contact point normally in contact with said first contact point, and a pair of concentric slip rings, one electrically connected to each of said contact points,
  said high points engaging each said arm at different times to break contact momentarily between said first and second contact point and to cause said distributor arm to break contact momentarily with said second pin and make contact with said third pin,
  a stationary non-conductive electrical distributing plate facing said mounting plate and secured to the engine crankcase,
  first, second, and third conductive rings supported concentrically by said distributing plate, spaced apart from each other and opposite said first, second, and third pins across a narrow air gap enabling arcing thereacross, said first ring being linked directly to the electrical ignition output of a coil,
  a first spark plug connected to said second ring for ignition in one said cylinder,
  a second spark plug connected to said third ring for ignition in the other said cylinder, and
  two conductive brushes supported by said distributing plate and in contact with said slip rings for supplying constant electrical current thereto at all times,
  said transmitting means including means for rotating said flywheel shaft at $2\frac{1}{2}$ times the rotational speed of said support shafts during their rotation.

39. The engine of claim 24 wherein
  said casing has a cool-air receiving opening on the opposite side of said engine plane from said flywheel,
  an air cleaner at said opening,
  an oil reservoir in said casing below said engine,
  a heat exchanger at the lower end of said oil reservoir,
  a set of vanes on said flywheel for moving air across said cylinders toward said flywheel, and for impelling air from there through said heat exchanger and then out from said casing on the opposite side of said engine plane from said flywheel.

40. The engine of claim 39 having filter means in said casing for filtering said air immediately after its passage across said cylinders and oil-return means for removing lubricating oil therefrom and returning it to said oil reservoir.

41. The engine of claim 24 wherein said cylinders and said engine casing both have groups of external heat-dissipating fins for cooling the engine casing by external air and also for cooling cylinders by the passage of incoming air around them.

42. The engine of claim 24 having intake means and exhaust means for each said cylinder and timing means controlled by the other cylinder for opening and closing each said intake means.

43. The engine of claim 24, wherein said pistons are provided with external steel sleeves and said cylinders are provided with compression rings in their interior walls.

* * * * *